(12) United States Patent
Aoki et al.

(10) Patent No.: US 6,879,434 B2
(45) Date of Patent: Apr. 12, 2005

(54) DISTRIBUTED RAMAN AMPLIFIER FOR OPTICAL NETWORK AND METHOD

(75) Inventors: Yasuhiko Aoki, Richardson County, TX (US); Susumu Kinoshita, Plano, TX (US)

(73) Assignee: Fujitsu Network Communications, Inc., Richardson, TX (US)

( * ) Notice: Subject to any disclaimer, the term of this patent is extended or adjusted under 35 U.S.C. 154(b) by 321 days.

(21) Appl. No.: 10/193,538

(22) Filed: Jul. 11, 2002

(65) Prior Publication Data

US 2004/0008404 A1 Jan. 15, 2004

(51) Int. Cl.[7] ............................ H01S 3/00; H04B 10/20
(52) U.S. Cl. ......................................... 359/334; 398/59
(58) Field of Search ............................ 359/334; 398/59, 398/62

(56) References Cited

U.S. PATENT DOCUMENTS

| | | | |
|---|---|---|---|
| 5,083,874 A | 1/1992 | Aida et al. ..................... 385/24 |
| 5,854,698 A | 12/1998 | Eskildsen et al. ........... 359/119 |
| 5,905,838 A | 5/1999 | Judy et al. ................... 385/123 |
| 5,959,750 A | 9/1999 | Eskildsen et al. ........... 359/134 |
| 6,115,174 A | 9/2000 | Grubb et al. ................ 359/334 |
| 6,151,160 A | 11/2000 | Ma et al. ..................... 359/341 |
| 6,160,648 A | 12/2000 | Öberg et al. ................. 359/130 |
| 6,163,636 A | 12/2000 | Stentz et al. .................. 385/24 |
| 6,205,268 B1 | 3/2001 | Chraplyvy et al. ............. 385/24 |
| 6,236,487 B1 | 5/2001 | Stephens ..................... 359/161 |
| 6,282,002 B1 | 8/2001 | Grubb et al. ................ 359/160 |
| 6,304,368 B1 | 10/2001 | Hansen et al. ............... 359/334 |
| 6,321,004 B1 | 11/2001 | Duerksen et al. .............. 385/24 |
| 6,333,798 B1 | 12/2001 | Allan et al. .................. 359/127 |
| 6,339,495 B1 | 1/2002 | Cowle et al. .............. 359/341.4 |
| 6,456,426 B1 * | 9/2002 | Bolshtyansky et al. ...... 359/334 |
| 6,751,418 B2 * | 6/2004 | Milton et al. .................. 398/79 |

FOREIGN PATENT DOCUMENTS

| | | | |
|---|---|---|---|
| EP | 0 789 432 A1 | 8/1997 | ............. H01S/3/30 |
| EP | 1 061 684 A1 | 12/2000 | ............. H04J/14/02 |
| EP | 1 176 742 A2 | 1/2002 | ............. H04B/10/17 |

OTHER PUBLICATIONS

Grenfeldt, "ERION—Ericsson optical networking using WDM technology," Ericsson Review No. 3, pp. 132–137, 1998.
Ashmead, "ROADMap for the Metro Market," Fiberoptic Product News, 3 pages (36, 38, and 40), Oct. 2001.
Batchellor, "Optical Networking the Ericsson Way," Ericsson Limited, Business Unit Transport and Cable Networks, pp. 1–4, Feb. 22, 2002.
International Search Report for PCT/US03/21512, 7 pages, Jan. 29, 2004.
K.H. Yla–Jarkko et al., "Achieving Long Repeaterless Sections in High–Density Metroplitan WDM Networks," *IEEE Photonics Technology Letters*, 2002, 3 pages.
Howard Kidorf et al., "Pump Interactions in a 100–nm Bandwidth Raman Amplifier," *IEEE Photonics Technology Letters*, 3 1999, pages.
Jun Shan Wey et al., "Crosstalk Bandwidth in Backward Pumped Fiber Raman Amplifiers," *IEEE Photonics Technology Letters*, 1999, 3 pages.
Vince Dominic et al., "Second–order distributed Raman amplification with a high–power 1370 nm laser diode," *Optical Society of America*, 2001, 3 pages.
C.R.S. Fludger et al., "Inline Loopbacks for Improved OSNR and reduced Double Rayleigh Scattering in Distributed Raman Amplifiers," *Optical Society of America*, 2001, 3 pages.

* cited by examiner

*Primary Examiner*—Mark Hellner
(74) *Attorney, Agent, or Firm*—Baker Botts L.L.P.

(57) ABSTRACT

An optical ring is operable to transport traffic signals between nodes. A Raman pump source is coupled to the optical ring. The Raman pump source is operable to provide pump power to at least a portion of the optical fiber ring. Each node comprises an optical splitter operable to at least passively drop traffic to the optical fiber ring. Each node further comprises a pump filter operable to separate at the node the pump power from traffic signals.

34 Claims, 14 Drawing Sheets

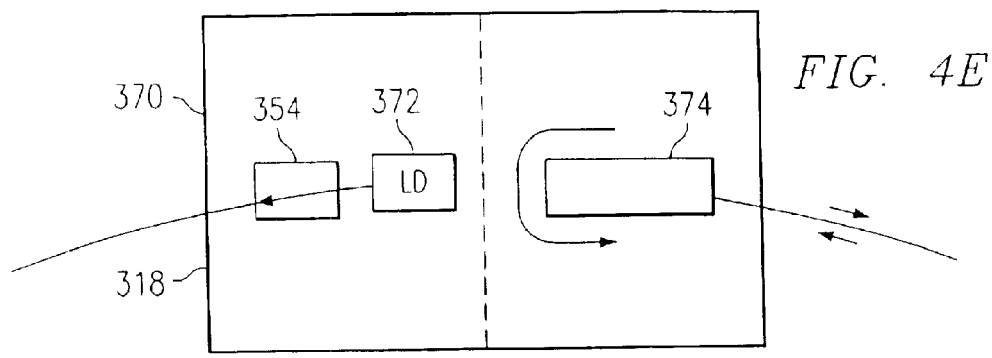
FIG. 4E
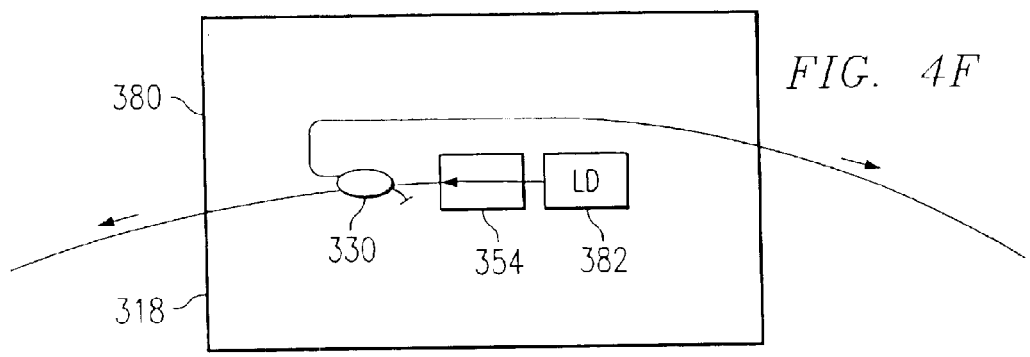
FIG. 4F
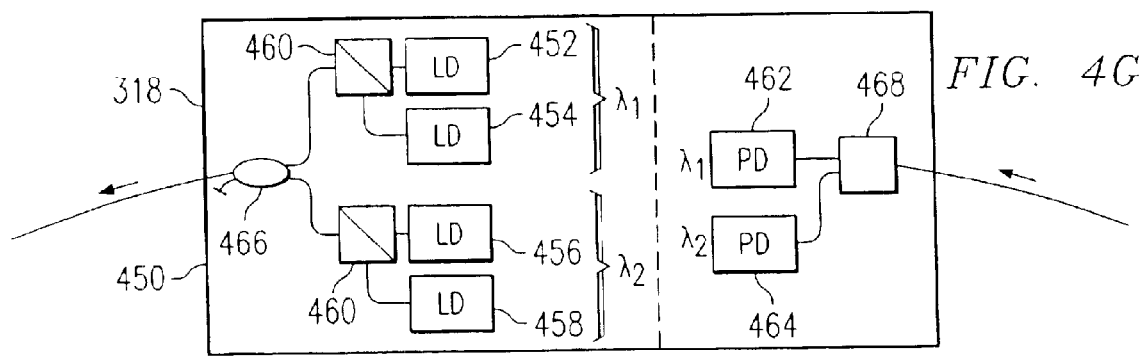
FIG. 4G
FIG. 4H
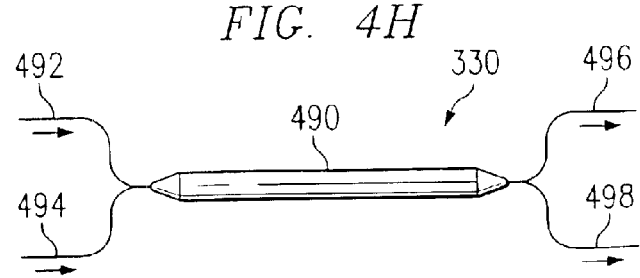

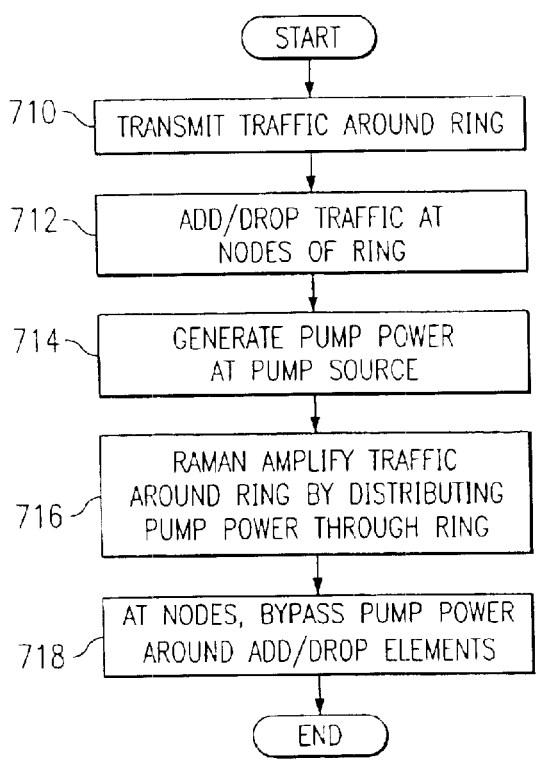
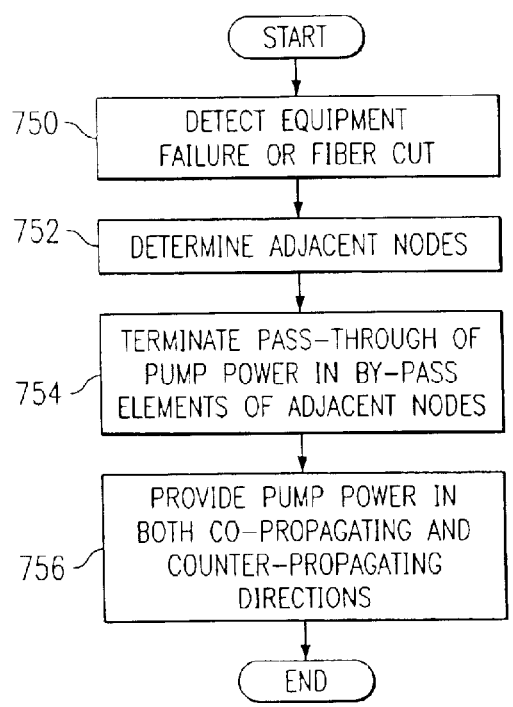
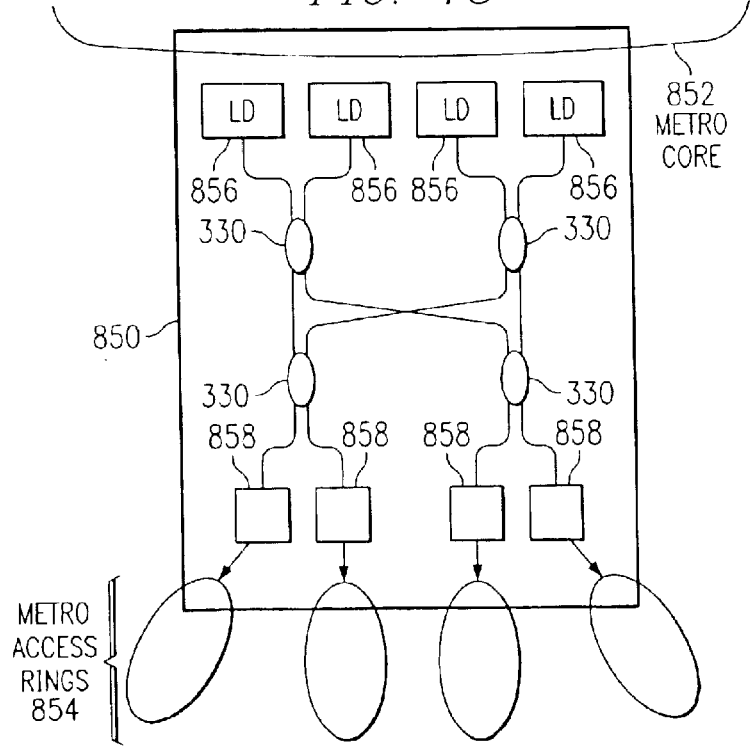

DISTRIBUTED RAMAN AMPLIFIER FOR OPTICAL NETWORK AND METHOD

TECHNICAL FIELD OF THE INVENTION

The present invention relates generally to optical transport systems, and more particularly to a distributed Raman amplifier for an optical network and method.

BACKGROUND OF THE INVENTION

Telecommunications systems, cable television systems and data communication networks use optical networks to rapidly convey large amounts of information between remote points. In an optical network, information is conveyed in the form of optical signals through optical fibers. Optical fibers are thin strands of glass capable of transmitting the signals over long distances with very low loss.

Optical networks often employ wavelength division multiplexing (WDM) or dense wavelength division multiplexing (DWDM) to increase transmission capacity. In WDM and DWDM networks, a number of optical channels are carried in each fiber at disparate wavelengths. Network capacity is based on the number of wavelengths, or channels, in each fiber and the bandwidth, or size of the channels. In WDM, DWDM and other optical networks, microelectro-mechanical switches (MEMS), arrayed waveguide gratings (AWGs), interleavers, and/or fiber gratings (FGs) are typically used to add and drop traffic at network nodes and to multiplex and demultiplex traffic at network nodes. In WDM and other optical networks, erbium-doped fiber amplifiers are typically deployed to amplify the optical signal input and output at each node.

SUMMARY OF THE INVENTION

The present invention provides a distributed Raman amplifier for an optical network and a corresponding method that eliminate or reduce problems and disadvantages associated with previous systems and methods. In a particular embodiment, a pump source is coupled to an optical fiber ring, the optical fiber ring operable to transport traffic signals between nodes. The pump source is operable to provide pump power to at least a portion of the optical fiber ring for Raman amplification of the traffic signals. Each node comprises an optical splitter operable to at least passively drop traffic to the optical fiber ring. Each node further comprises a pump filter operable to separate at the node the pump power from traffic signals.

In accordance with one embodiment of the present invention, the node further comprises a bypass element to bypass pump power from an add/drop element of the node, and a combiner to recombine the pump power with the traffic signal after bypass of the add/drop element of the node.

Technical advantages of the present invention include providing a distributed Raman amplifier and method for an optical fiber ring. In one embodiment, a single Raman amplification pump may provide Raman amplification for an entire optical ring network. Pump power may be recycled and/or conserved via pump bypass elements, reflectors, and/or by transferring excess pump power to and from different rings.

Another technical advantage of the present invention includes providing an optical ring network with fast transient response and broadband amplification. In a particular embodiment gain width may be greater than 100 nanometers. Transient response may be in the order of picoseconds, with low or no surge and low noise.

Another technical advantage is providing an optical ring network with pay-as-grow or in-service upgradability by adding pump sources at different wavelengths to cover broader bandwidths, larger rings, or a greater number of nodes. In a particular embodiment, pumps may be added to amplify a broader range of bandwidths with only 10–20 nanometer granularity between pump bandwidths. In a particular embodiment, multiple pumps may be used to amplify the entire range of C band and L band wavelengths.

Still another technical advantage of the present invention includes Raman amplification of a plurality of optical rings using a single Raman pump laser diode unit or a limited number of such units. In a particular embodiment a two watt laser may be used for amplifying four metro access rings connected at a metro core hub.

Still another technical advantage of the present invention includes providing a Raman amplified optical ring network with flexible channel spacing and low node loss. Passive couplers may be used to add and/or drop traffic. Node loss may be limited to about 4–5 dB.

It will be understood that the various embodiments of the present invention may include some, all, or none of the enumerated technical advantages. In addition, other technical advantages of the present invention may be readily apparent to one skilled in the art from the following figures, description and claims.

BRIEF DESCRIPTION OF THE DRAWINGS

For a more complete understanding of the present invention and its advantages, reference is now made to the following description taken in conjunction with the accompanying drawings, wherein like numerals represent like parts, in which:

FIGS. 4A–4G are block diagrams illustrating details of amplification or bypass modules of the node of FIG. 2 in accordance with various embodiments of the present invention;

FIG. 4H is a block diagram illustrating details of an optical coupler of the node of FIG. 3 in accordance with one embodiment of the present invention;

FIG. 14 is a flow diagram illustrating a method of Raman amplifying traffic in an optical network in accordance with one embodiment of the present invention;

FIG. 16 is a flow diagram illustrating a method of Raman amplification protection switching in accordance with various other embodiments of the present invention; FIG. 18 is a block diagram illustrating a plurality of optical networks in a metro access environment in accordance with one embodiment of the present invention.

DETAILED DESCRIPTION OF THE INVENTION

Figure 1:
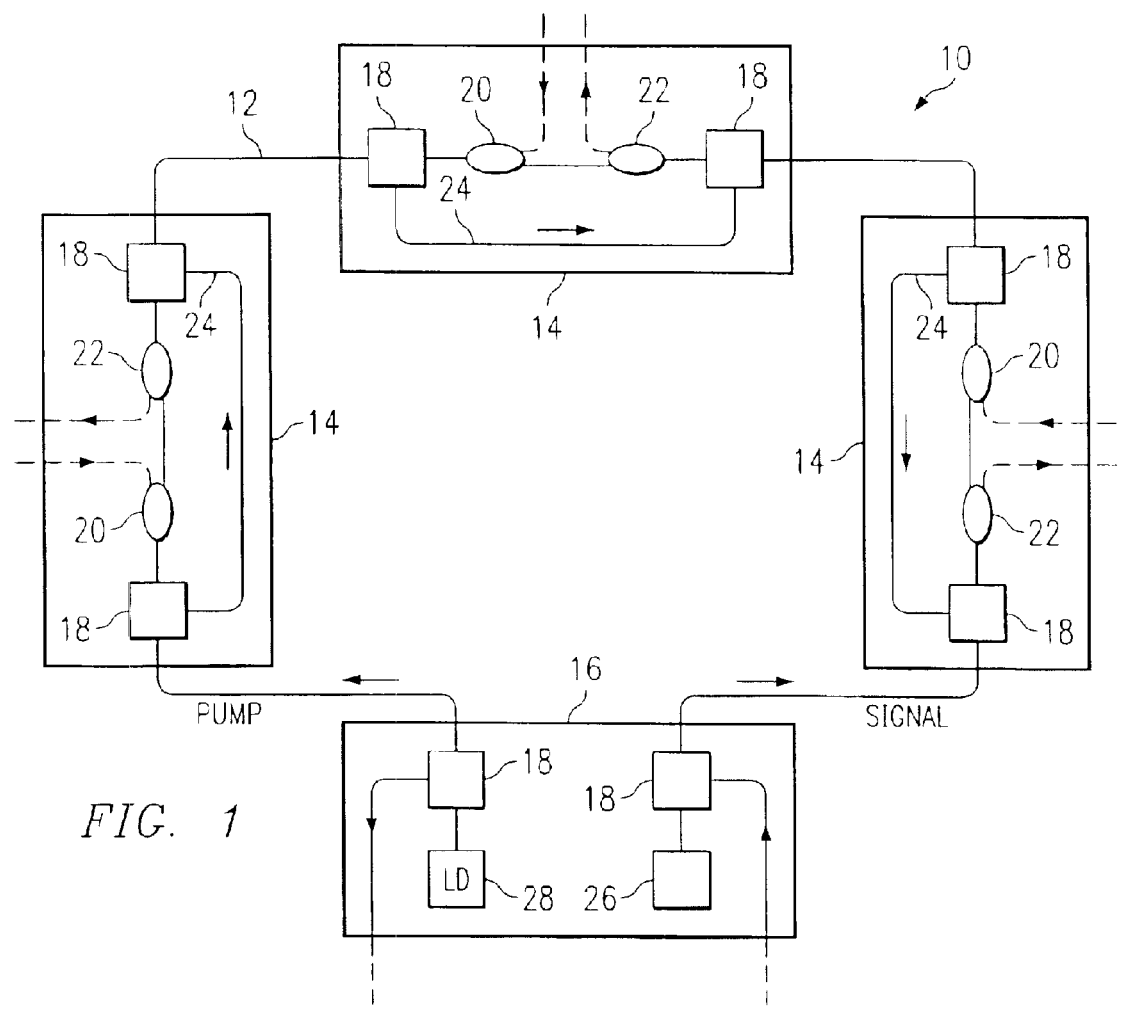
FIG. 1 is a block diagram illustrating an optical network in accordance with one embodiment of the present invention.

FIG. 1 illustrates an optical network 10 in accordance with one embodiment of the present invention. In this embodiment, the optical network 10 is a flexible, single open-ring network.

Referring to FIG. 1, the network 10 comprises a single optical fiber 12, a hub node 16, and a plurality of add/drop nodes 14. A number of optical channels may be carried over a common path within network 10 at disparate wavelengths. The network 10 may be a wavelength division multiplexing (WDM), dense wavelength division multiplexing (DWDM), or other suitable multi-channel network. The network 10 may be used in a short-haul metropolitan network, and long-haul inter-city network or any other suitable network or combination of networks. The optical signals have at least one characteristic modulated to encode audio, video, textual, real-time, non-real-time and/or other suitable data. Modulation may be based on phase shift keying (PSK), intensity modulation (IM) and other suitable methodologies.

Hub node 16 and add/drop nodes 14 are each operable to add and drop traffic to and from the ring 12. As used herein, the term "each" means every one of at least a subset of the identified items. In adding and dropping traffic, the nodes 14 and 16 may multiplex data from clients for transmittal in the ring 12 and may demultiplex channels of data from the ring 12.

Traffic may be added to the ring 12 by inserting the traffic channels or otherwise combining signals of the channels into a transport signal of which at least a portion is transmitted on a ring. Traffic may be dropped by making the traffic available for transmission to the local clients. Thus, traffic may be dropped and yet continue to circulate on a ring. In a particular embodiment, traffic is passively added to or dropped from the ring 12. "Passive" in this context means the adding or dropping of channels without power, electricity, and/or moving parts. An active device would thus use power, electricity or moving parts to perform work. In a particular embodiment, traffic is passively added to ring 12 via passive add couplers/splitters 20 and passive drop coupler/splitters 22, which add/drop by splitting/combining, which is without multiplexing/demultiplexing, in ring 12 and/or separating parts of a signal in the ring. In this embodiment, channel spacing may be flexible in the ring 12 and the add/drop elements on the ring 12 need not be configured with channel spacing. Thus, channel spacing may be set by and/or at the add/drop receivers and senders of the nodes 14 and 16 coupled to a client or clients.

The traffic signals carried by the ring 12 may be Raman amplified with one or more pumps 28 in hub node 16. Within the nodes 14, pump power may be conserved by filtering out the pump power via WDM filters 18 and bypassing the add/drop elements via bypass elements 24. Pump power may be terminated at hub node 16 via optical terminator 26. Add/drop elements comprise devices to add traffic-carrying signals to, or drop traffic-carrying signals from, the optical ring. In the illustrated embodiment, the add/drop elements comprise passive couplers which allow for flexible channel spacing. In other embodiments, add/drop elements may comprise filter devices such as thin film filters or fiber Bragg gratings which may drop single wavelengths or bands of wavelengths.

In Raman amplification, laser light of about 100 nm shorter wavelength than the signal to be amplified is transmitted along the same optical fiber as the signal. The amplifier laser light may be propagated either in the same direction as the signal (co-propagating), or in the opposite direction as the signal (counter-propagating). As the amplification laser light scatters off the atoms of the fiber, the signal picks up photons and its strength is thus increased. Raman amplification does not require any doping of the optical fiber. In the illustrated embodiment, pump power is transmitted in a counter-rotational direction (clockwise) relative to the direction of the traffic-carrying signal (counterclockwise). In other embodiments, pump power may be transmitted in the same direction as the traffic-carrying signal, or may be transmitted in both the same direction and in the counter-rotational direction.

In a particular embodiment, the network 10 may comprise a metro access network with a ring circumference of approximately 40 kilometers, and pump 28 may comprise a single 0.5 watt pump source. A ring with a larger circumference or with a greater number of add/drop nodes may require a higher-power pump source or sources. In addition, by using multiple pump sources of different wavelengths, Raman amplification may provide for amplification over a broad band. In a particular embodiment, an about 1430 nanometer Raman pump and an about 1470 nanometer Raman pump may together cover the C band range of about 1530 to 1565 nanometers. Raman amplification may provide for a gain width of over 100 nanometers. With additional pump sources, if may be possible to, for example, Raman amplify the C band and L band wavelengths in a network.

Figure 2:
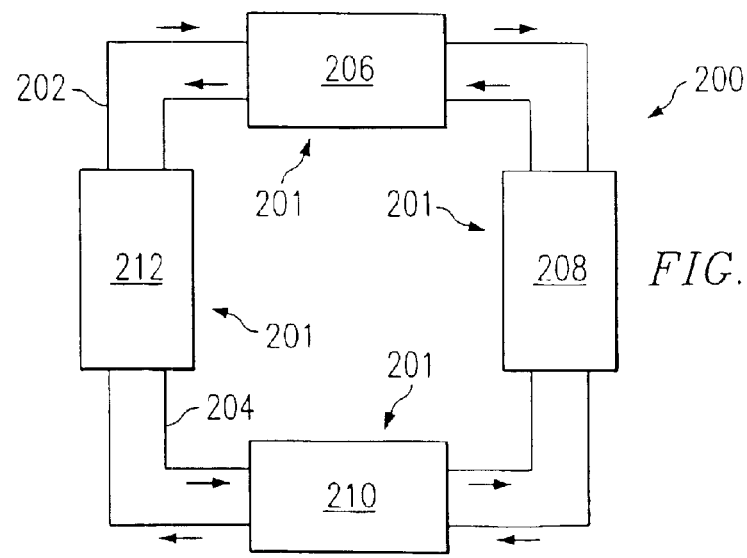
FIG. 2 is a block diagram illustrating an optical network in accordance with another embodiment of the present invention.

FIG. 2 illustrates an optical network 200 in accordance with another embodiment of the present invention. In this embodiment, the optical network 200 is a flexible open ring network.

Referring to FIG. 2, the network 200 is an optical ring. An optical ring may include, as appropriate, a single, unidirectional fiber, a single, bi-directional fiber, or a plurality of uni- or bi-directional fibers. In the illustrated embodiment, the network 200 includes a pair of unidirectional fibers, each transporting traffic in opposite directions, specifically a first fiber, or ring, 202 and a second fiber, or ring, 204, with each ring connecting nodes 206, 208, 210, and 212. Like network 10 of FIG. 1, a number of optical channels may be carried over a common path within network 200 at disparate wavelengths. The network 200 may be a wavelength division multiplexing (WDM), dense wavelength division multiplexing (DWDM), or other suitable multi-channel network. The network 200 may be used in a short-haul metropolitan network, and long-haul inter-city network or any other suitable network or combination of networks.

In network 200, optical information signals are transmitted in different directions on the rings 202 and 204 to provide fault tolerance. The optical signals have at least one characteristic modulated to encode audio, video, textual, real-time, non-real-time and/or other suitable data. Modulation may be based on phase shift keying (PSK), intensity modulation (IM) and other suitable methodologies.

In the illustrated embodiment, the first ring 202 is a clockwise ring in which traffic is transmitted in a clockwise direction. The second ring 204 is a counterclockwise ring in which traffic is transmitted in a counterclockwise direction. The nodes 201 are each operable to add and drop traffic to and from the rings 202 and 204. In particular, each node 201 receives traffic from local clients and adds that traffic to the rings 202 and 204. At the same time, each node 201 receives traffic from the rings 202 and 204 and drops traffic destined for the local clients. In adding and dropping traffic, the nodes 201 may multiplex data from clients for transmittal in the rings 202 and 204 and may demultiplex channels of data from the rings 202 and 204 for clients.

Traffic may be added to the rings 202 and 204 by inserting the traffic channels or otherwise combining signals of the channels into a transport signal of which at least a portion is transmitted on a ring. Traffic may be dropped by making the traffic available for transmission to the local clients. Thus, traffic may be dropped and yet continue to circulate on a ring. In a particular embodiment, traffic is passively added to and dropped from the rings 202 and 204. In a particular embodiment, traffic may be passively added to and/or dropped from the rings 202 and 206 by splitting/combining, which is without multiplexing/demultiplexing, in the transport rings and/or separating parts of a signal in the ring.

In a particular embodiment, traffic is passively added to and passively dropped from the rings 202 and 204. In this embodiment, channel spacing may be flexible in the rings 202 and 204 and the node elements on the rings 202 and 204 need not be configured with channel spacing. Thus, channel spacing may be set by and/or at the add/drop receivers and senders of the nodes 201 coupled to the client. The transport elements of the nodes 201 communicate the received traffic on the rings 202 and 204 regardless of the channel spacing of the traffic.

Each ring 202 and 204 has a terminating point such that the rings 202 and 204 are "open" rings. The opening in the rings 202 and 204 may be a physical opening, an open, crossed, or other non-closed switch, a deactivated transmission device or other obstruction operable to completely or effectively terminate, and thus remove channels from the rings 202 and 204 at the terminal points such that interference of each channel with itself due to recirculation is prevented or minimized such that the channels may be received and decoded within normal operating limits.

In one embodiment, the rings 202 and 204 are open, and thus terminate, in the nodes 201. In a particular embodiment, the rings 202 and 204 may terminate in neighboring nodes 201 at corresponding points along the rings 202 and 204. Terminal points in the rings 202 and 204 may be corresponding when, for example, they are between add and/or drop devices of two neighboring nodes or when similarly positioned within a same node. Further details regarding the open ring configuration are described below in reference to FIG. 4.

As described in further detail below, the traffic signals carried by the rings of network 200 may be amplified with one or more distributed Raman amplifiers. Raman amplification may provide for broad-band amplification, fast transient response, and low- or no-surge adding and dropping of channels. Nodes 201 may comprise amplification modules so that pump power may bypass add/drop devices or terminal (open) points within the nodes, thus allowing efficient use of pump power.

In a particular embodiment, the network 200 may comprise a metro access network with a ring circumference of approximately 40 kilometers and four add/drop nodes, as illustrated, and each ring may be amplified by a single 0.5 watt pump source. A ring with a larger circumference or with a greater number of add/drop nodes may require a higher-power pump source or a greater number of pump sources.

Figure 3:
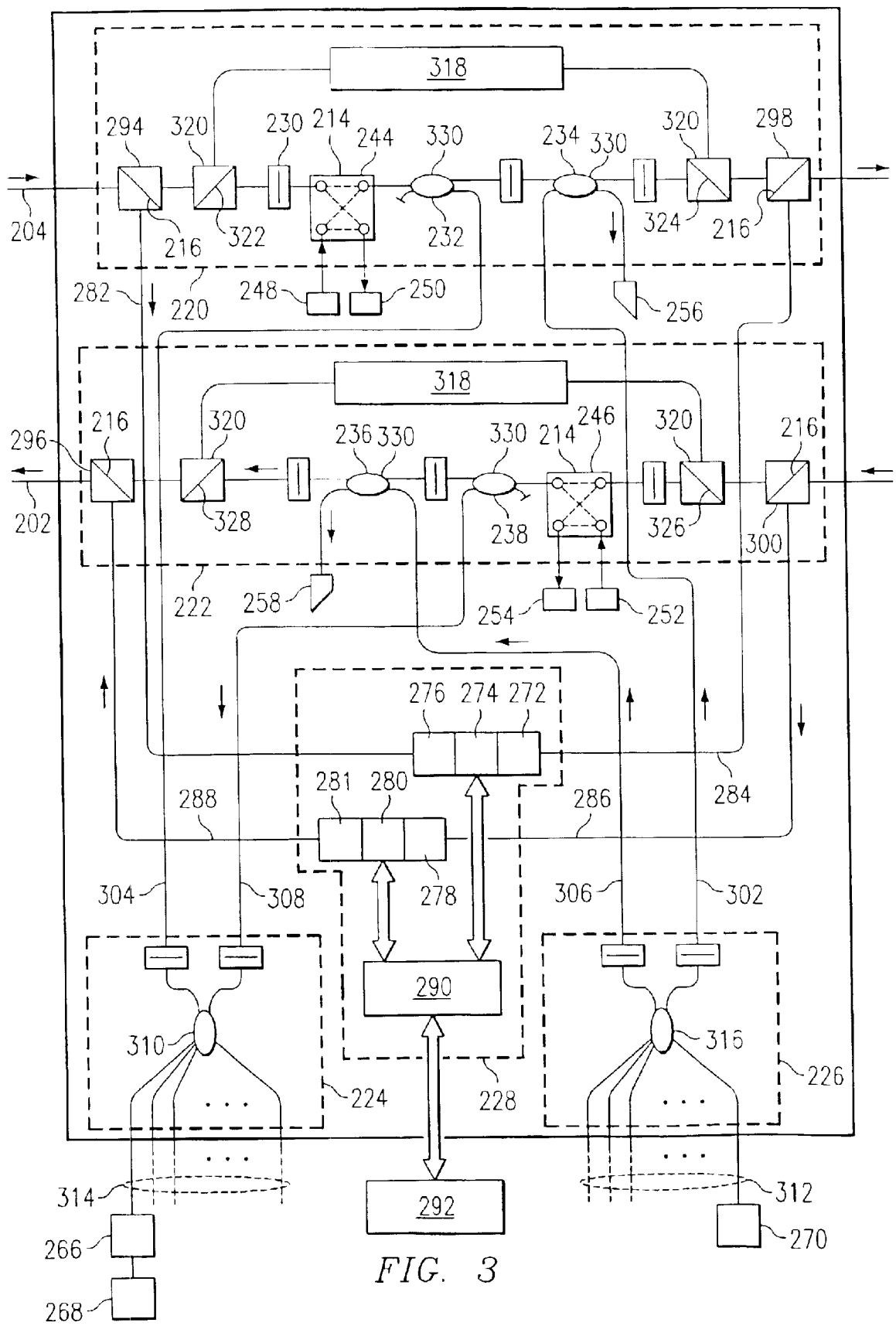
FIG. 3 is a block diagram illustrating details of a node of FIG. 2 in accordance with one embodiment of the present invention.

FIG. 3 illustrates details of node 201 of the network of FIG. 2 in accordance with one embodiment of the present invention. Referring to FIG. 3, the node 201 comprises counterclockwise transport element 220, clockwise transport element 222, distributing element 224, combining element 226, and managing element 228. In one embodiment, the elements 220, 222, 224, 226 and 228 as well as components within the elements may be interconnected with optical fiber links. In other embodiments, the components of this and other modes may be implemented in part or otherwise with planar waveguide circuits and/or free space optics. The elements of node 201 may each be implemented as one or more discrete cards within a card shelf of the node 201. The connectors 230 may allow efficient and cost effective replacement of failed components. It will be understood that additional, different and/or other connectors may be provided as part of the node 201.

Transport elements 220 and 222 may each comprise passive couplers or other suitable optical splitters/couplers 330, ring switch 214, OSC filters 216, pump filters 320, and amplification modules 318. Optical splitters/couplers 330 may comprise splitters/couplers 330 or other suitable passive devices. Pump filters 320 may comprise WDM couplers or other suitable filters or elements operable to separate out a pump power band from traffic bands. Amplification modules 318 may comprise Raman pumps, by-pass elements, switches, and/or other suitable devices for distributed Raman amplification. Further details regarding amplification modules are described below in reference to FIGS. 4A–4G.

Ring switch 214 may be a 2×2 or other switch operable to selectively open the connected ring 202 or 204. In the 2×2 embodiment, the switch 214 includes a "cross" or open position and a "through" or closed position. The cross position may allow for loopback, localized and other signal testing. The open position allows the ring openings in the nodes 201 to be selectively reconfigured to provide protection switching.

In the specific embodiment of FIG. 3, counterclockwise transport element 220 includes a passive optical splitter set having a counterclockwise drop coupler 232 and a counterclockwise add coupler 234. The counterclockwise transport element 220 further includes pump filters 322 and 324 and OSC filters 294 and 298 at the ingress and egress edges of the transport element. Counterclockwise ring switch 244 is on the ingress side of the transport element and/or drop coupler.

Clockwise transport element 222 includes a passive optical splitter set including clockwise add coupler 236 and clockwise drop coupler 238. Clockwise transport element 222 further includes pump filters 326 and 328 and OSC filters 296 and 300 disposed at the ingress and egress edges. Clockwise ring switch 246 is disposed on the ingress side of the transport element and/or drop coupler.

In the illustrated embodiment, the OSC filters are disposed at the ingress and egress edges of the transport elements. In an alternative embodiment, pump filters 326 and 328 may instead be disposed at the ingress and egress edges of the transport elements, and the OSC filters disposed at the egress side of pump filters 322 and 326 and at the ingress side of pump filters 324 and 328, respectively. In this way, pump power may bypass the OSC filters and loss of pump power at the OSC filters may be avoided.

Distributing element 224 may comprise a passive drop coupler 310 which receives dropped signals from the transport elements via counterclockwise drop segment 304 and clockwise drop segment 308. A plurality of egress leads from coupler 310 comprises a plurality of drop leads 314. Drop leads 314 may be connected to one or more tunable filters 266 which in turn may be connected to one or more broadband optical receivers 268.

In another embodiment, distributing element 224 may comprise wavelength demultiplexers coupled to drop leads 304 and 308. In such an embodiment, the egress leads of the demultiplexers may be directly coupled to receivers 268 and tunable filters 266 may be omitted.

Combining element 226 may comprise a passive coupler 316 which may be connected to one or more add optical senders 270 via add leads 312. Splitter 324 further comprises two optical fiber egress leads which feed into clockwise add segment 306 and counterclockwise add segment 302.

In another embodiment, coupler 316 may be omitted from combining element 224, and transmitters 270 may be coupled to the ingress leads of wavelength multiplexers. The egress leads of the wavelength multiplexers in such an embodiment would be coupled to add leads 302 and 306.

Managing element 228 may comprise OSC senders 272 and 281, OSC interfaces 274 and 280, OSC receivers 276 and 278, and an element management system (EMS) 290. Each OSC sender, OSC interface and OSC receiver set forms an OSC unit for one of the rings 202 or 204 in the node 201. The OSC units receive and transmit OSC signals for the EMS 290. The EMS 290 may be communicably connected to a network management system (NMS) 292. NMS may reside within node 201, in a different node, or external to all of the nodes 201.

EMS 290, NMS 292 and/or other elements or parts of the described nodes or networks may comprise logic encoded in media for performing network and/or node monitoring, failure detection, protection switching and loopback or localized testing functionality of the network 200. Logic may comprise software encoded in a disk or other computer-readable medium and/or instructions encoded in an application specific integrated circuit (ASIC), field programmable gate array (FPGA), or other processor or hardware. It will be understood that functionality of EMS 290 and/or NMS 292 may be performed by other components of the network 200 and/or be otherwise distributed or centralized.

For example, operation of NMS 292 may be distributed to the EMS of nodes 201 and the NMS omitted. Similarly, the OSC units may communicate directly with NMS 292 and EMS 290 omitted.

The node 201 further comprises OSC fiber segments 282, 284, 286, and 288, and optical spectrum analyzer (OSA) connectors 250, 254, 256, and 258. The OSA connectors 256 and 258 may be angled connectors to avoid reflection. Test signal may sometimes be fed into the network from connectors 248 and 252. As previously described, a plurality of passive physical contact connectors 230 may be included where appropriate so as to communicably connect the various elements of node 201.

In operation, the transport elements 220 and 222 are operable to passively add local traffic to the rings 202 and 204 and to passively drop at least local traffic from the rings 202 and 204. The transport elements 220 and 222 may further be operable to passively add and drop the OSC signal to and from the rings 202 and 204 and to bypass pump power or to re-pump pump power for Raman amplification. More specifically, in the counterclockwise direction, OSC filter 294 processes an ingress optical signal from counterclockwise ring 204. OSC filter 294 filters the OSC signal from the optical signal and forwards the OSC signal to the OSC interface 274 via fiber segment 282 and OSC receiver 276. By placing the OSC filter 294 outside of the ring switch 244, the node 201 is able to recover the OSC signal regardless of the position of the ring switch 244. OSC filter 294 also forwards or lets pass the remaining transport optical signal to pump filters 322. Pump filter 322 may act as a combiner to add counter-rotational Raman pump power from module 318 to ring 204 and/or, depending on the configuration of module 318, may act as a separator to filter the pump power from the signal and forwards the pump power to module 318. By placing the OSC filter 294 outside of the ring switch 244, the node 201 is able to recover the OSC signal regardless of the position of the ring switch 244.

Ring switch 244 is selectively operable to transmit the optical signal to coupler 232 when the ring switch 244 is set to the through (closed) setting, or to transmit the optical signal to OSA connector 250 when the ring switch 244 is set to the cross (open) setting. Further details regarding the OSA connectors are described below.

If ring switch 244 is set in the cross position, the optical signal is not transmitted to couplers 232 and 234, the ring 204 is open at the node 201, and dropping of traffic from the ring 204 does not occur at node 201. However, adding of traffic at node 201 occurs and the added traffic flows to the next node in the ring 204. If the ring switch 244 is set in the through position, the optical signal is forwarded to couplers 232 and 234 and adding and dropping of traffic to and from the ring 204 may occur at node 201.

Coupler 232 passively splits the signal from switch 244 into two generally identical signals. A passthrough signal is forwarded to coupler 234 while a drop signal is forwarded to distributing element 224 via segment 304. The signals may be substantially identical in content and/or power, or may be substantially identical in content but differ in power. Coupler 234 passively combines the passthrough signal from coupler 232 and an add signal comprising local add traffic from combining element 226 via fiber segment 302. The combined signal is passed to pump filter 324 which may act as a combiner to add pump power to ring 204 and/or, depending on the configuration of the module 318, may act as a separator to filter pump power from the signal and forward the pump power to module 318.

OSC filter 298 adds an OSC signal from the OSC interface 274, via the OSC sender 272 and fiber segment 284, to the combined optical signal and forward the combined signal as an egress transport signal to ring 204. The added OSC signal may be locally generated data or may be received OSC data passed through the EMS 290.

In the clockwise direction, OSC filter 300 receives an ingress optical signal from clockwise ring 202. OSC filter 300 filters the OSC signal from the optical signal and forwards the OSC signal to the OSC interface 280 via fiber segment 286 and OSC receiver 278. OSC filter 300 also forwards the remaining transport optical signal to pump filter 326. Pump filter 326 may act as a combiner to add counter-rotational pump power from module 318 to ring 202 and/or, depending on the configuration of module 318, may act as a separator to filter pump power from the signal and forward the pump power to module 318.

Ring switch 246 is selectively operable to transmit the optical signal to coupler 238 when the ring switch 246 is set to the through setting, or to transmit the optical signal to OSA connector 254 when the ring switch 246 is set to the cross setting.

If the ring switch 246 is set in the cross position, the optical signal is not transmitted to couplers 238 and 236, the ring 204 is open at the node 201, and dropping of traffic from the ring 202 does not occur at node 201. However, adding of traffic to the ring 202 occurs at node 201. If the ring switch 246 is set in the through position, the optical signal is forwarded to couplers 238 and 236 and adding and dropping of traffic to and from the ring 202 may occur at node 201.

Coupler 238 passively splits the signal from switch 246 into generally identical signals. A passthrough signal is forwarded to coupler 236 while a drop signal is forwarded to distributing unit 224 via segment 308. The signals may be substantially identical in content and/or power, or may be substantially identical in content but differ in power. Coupler 236 passively combines the passthrough signal from coupler 238 and an add signal comprising local add traffic from combining element 226 via fiber segment 306. The combined signal is passed to pump filter 328 which may act as a combiner to add pump power to ring 202 and/or, depending on the configuration of the module 318, act as a separator may filter pump power from the signal and forward the pump power to the module 318.

OSC filter 296 adds an OSC signal from the OSC interface 280, via the OSC sender 281 and fiber segment 288, to the combined optical signal and forwards the combined signal as an egress transport signal to ring 202. As previously described, the OSC signal may be locally generated data or data passed through by EMS 290.

Prior to addition to the rings 202 and 204, locally-derived traffic is transmitted by a plurality of add optical senders 270 to combining element 226 of the node 201 where the signals are combined, amplified, and forwarded to the transport elements 220 and 222, as described above, via counterclockwise add segment 302 and clockwise add segment 306. The locally derived signals may be combined by the optical coupler 324, by a multiplexer or other suitable device.

Locally-destined traffic is dropped to distributing element 224 from counterclockwise drop segment 304 and clockwise drop segment 308. Distributing element 224 splits the drop signal comprising the locally-destined traffic into multiple generally identical signals and forwards each signal to an optical receiver 268 via a drop lead 314. The signal received by optical receivers 268 may first be filtered by filters 266. Filters 266 may be tunable filters or other suitable filters and receivers 268 may be broadband or other suitable receivers.

EMS 290 monitors and/or controls all elements in the node 201. In particular, EMS 290 receives an OSC signal in an electrical format via OSC filters 294, 296, 298 and 300, OSC receivers 276 and 278, OSC senders 272 and 281, and OSC interfaces 274 and 280. EMS 290 may process the signal, forward the signal and/or loopback the signal. Thus, for example, the EMS 290 is operable to receive the electrical signal and resend the OSC signal to the next node, adding, if appropriate, node-specific error information or other suitable information to the OSC.

In one embodiment each element in a node 201 monitors itself and generates an alarm signal to the EMS 290 when a failure or other problem occurs. For example, EMS 290 in node 201 may receive one or more of various kinds of alarms from the elements and components in the node 201: an amplifier loss-of-light (LOL) alarm, an amplifier equipment alarm, an optical receiver equipment alarm, optical sender equipment alarm or other alarms. Some failures may produce multiple alarms. For example, a fiber cut may produce amplifier LOL alarms at adjacent nodes and also error alarms from the optical receivers.

In addition, the EMS 290 may monitor the wavelength and/or power of the optical signal within the node 210 via connections (not shown) between the OSA connectors 250, 254, 256, and 258 and an optical spectrum analyzer (OSA) communicably connected to EMS 290.

The NMS 292 collects error information from all of the nodes 201 and is operable to analyze the alarms and determine the type and/or location of a failure. Based on the failure type and/or location, the NMS 292 determines needed protection switching actions for the network 200. The protection switch actions may be carried out by NMS 292 by issuing instructions to the EMS 290 in the nodes 201. After a failure is fixed, the network 200 does not require reverting. Thus, the open ring network configuration does not change for protection switching, only the location of the openings. In this way, network operation is simplified and node programming and operation is cost minimized or reduced.

Error messages may indicate equipment failures that may be rectified by replacing the failed equipment. For example, a failed coupler in the distributing element may be detected and replaced. Similarly, a failure of an optical receiver or sender may trigger an optical receiver equipment alarm or an optical sender equipment alarm, respectively, and the optical receiver or sender replaced as necessary. The optical sender may have a shutter or cold start mechanism. Upon replacement, no other switching or reversion from a switched state may be required. As described further below, the NMS 292 may in response to certain messages or combinations of messages trigger a protection switching protocol.

The configuration of node 201 may be suitably varied without departing from the present invention. For example, in our embodiment, redundant ring switches may be provided in each of the transport elements. The redundant ring switches may allow for continued circuit protection in the event of switch failure and failed ring switches may be replaced without interfering the node operations or configuration. Ring switch failure may comprise, among other things, failure of a ring switch to change from the cross position to a through position, failure of a ring switch to change from a through position to the cross position, or the switch becoming fixed in an intermediate position. The redundant ring switches may thus allow for protection switching in the event that a switch fails to switch from the closed position to the open position. Furthermore, the cascaded switch configuration allows a switch operation test, because whenever one of the switches has the cross position, the other switches' position does not affect the network traffic. Alternatively, redundancy in the event of a switch stuck in the closed position can be accomplished without a redundant switch by turning off the amplifier for that ring in the node with the failed switch, thus effectively terminating the signal at the amplifier. In yet another embodiment, a single coupler may be used in each transport element to add and to drop traffic.

In yet another embodiment of the present invention, splitter/couplers 232, 234, 236, and 246 may be replaced with filter devices to add and drop traffic from the rings 202 and 204. Such filter devices may include thin film filters or fiber Bragg gratings which may drop single wavelengths or bands of wavelengths. In such an embodiment, channel spacing may be limited by the add/drop filter; however, switches 214 may be omitted and rings 202 and 204 may comprise closed, as opposed to open, rings.

Figure 4A:
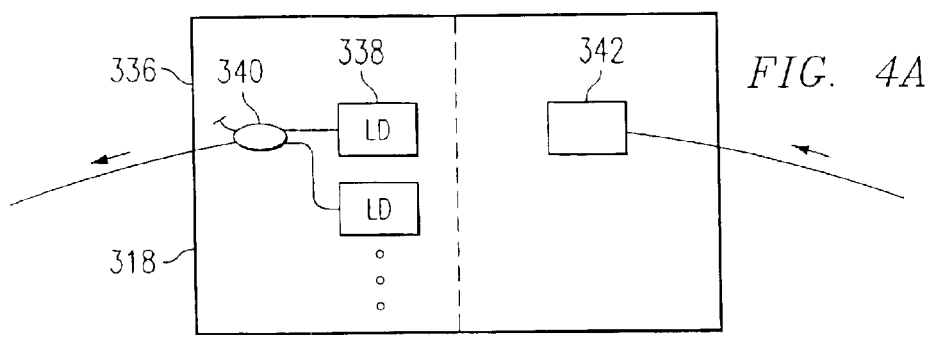

FIGS. 4A–4H illustrate details of components of node 201 in accordance with various embodiments of the present invention. FIGS. 4A–4G illustrate configurations of amplification module 318 which, depending upon the configuration of the module, may provide pump power to the network rings (either in the same direction as the traffic carrying signal or in a counter-rotational direction), monitor pump power, and/or allow pump power to by-pass the add/drop elements of the node. FIG. 4H illustrates details of a passive optical splitter/coupler 330 in accordance with one embodiment of the present invention.

In the configuration shown in FIG. 4A, amplification module 318 comprises pump module 336. Pump module 336 comprises one or more pumps (laser diodes) 338. Coupler 340 may allow for additional pumps 338 to be added so as to provide additional power to the rings 202 or 204 if required. Additional pumps 338 may also be added to cover additional wavelengths or bands. In a particular embodiment, an about 1430 nanometer Raman pump and an about 1470 nanometer Raman pump may together cover the C band range of about 1530 to 1565 nanometers. Coupler 340 may comprise a splitter/coupler 330 as described in reference to FIG. 4H or may comprise a WDM pump filter. Module 336 further comprises optical terminator 342 to terminate pump power.

Figure 4B:
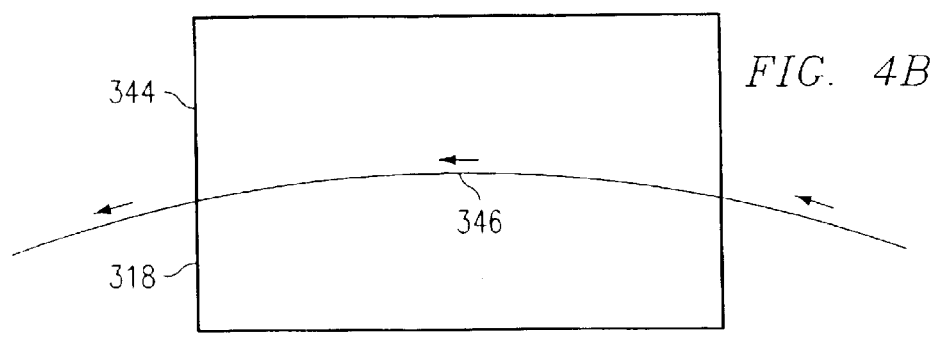

In the configuration shown in FIG. 4B, amplification module 318 comprises bypass module 344. Bypass module 344 comprises bypass element 346 which allows for pump power to bypass the add/drop and switch elements of the node 201. Bypass element 346 may comprise an optical fiber. As the pump power traverses a particular span of the optical fiber ring, the power may degrade and re-pumping may be required at the next node. In a particular embodiment, each of the nodes 201 in the network 200 may comprise an pump module 336 as shown in FIG. 4A for each transport element. In another embodiment, one or more of the nodes 201 may comprise pump modules 336 which may provide adequate pump power for the entire rings, and the remaining nodes may comprise bypass modules 344, with bypass modules 344 allowing for that pump power to bypass the add/drop and switch elements of the remaining nodes.

Figure 4C:
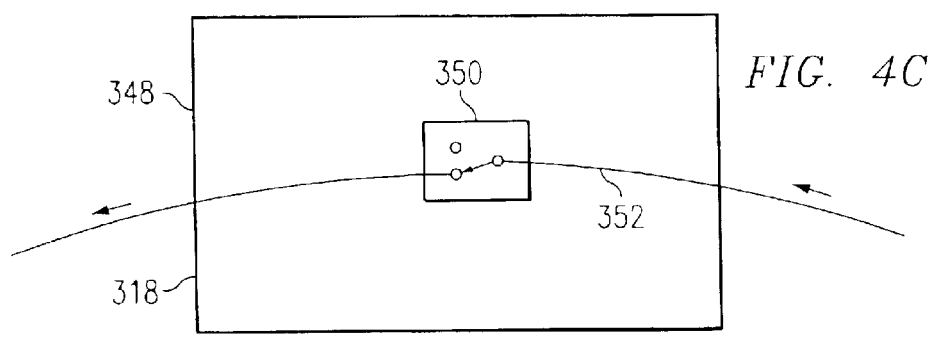

In the configuration shown in FIG. 4C, amplification module 318 comprises selective bypass module 348. Selective bypass module 348 of FIG. 4C comprises a switch 350 selectively operable to either pass or terminate pump power carried on bypass element 352. The switches 350 allow for module 348 to act as a bypass module in a similar fashion as with modules 344 of FIG. 4B, or, as described in further detail in reference to FIGS. 15 and 16, to be switched so as to terminate the pump power at the node to allow for repair of a line cut or other interruption of the network while maintaining eye safety.

Figure 4D:
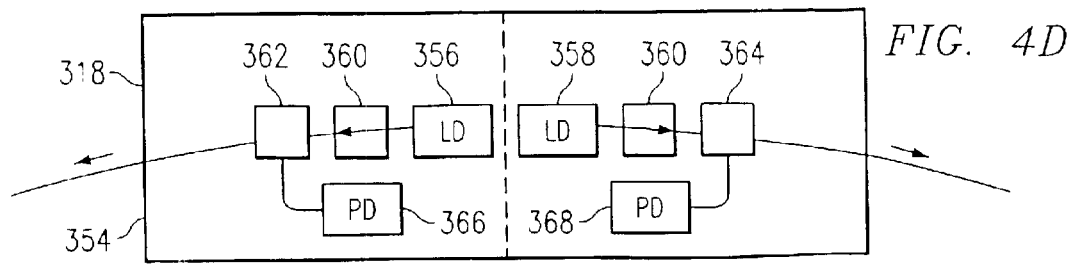

In the configuration shown in FIG. 4D, module 318 comprises bi-directional pump module 354, and allows for amplification laser light to be transmitted in either or both a rotational and counter-rotational direction relative to the direction of the traffic carrying signal. Bi-directional pump module 354 may be used in place of pump module 336 in certain embodiments and comprises pump sources 356 and 358, each transmitting pump power in different directions to the fiber ring, isolators 360, splitter modules 362 and 364, and photo detectors 366 and 368. Isolators 360 prevent feedback of the laser light and prevent laser light from reaching the laser diode in the opposite direction from the transmitting direction of the laser diode. Photo detectors 366 and 368 are operable to detect the presence, level, and/or absence of laser light, and pumps 356 and 358 and/or other pumps in the network may be turned on, off, and/or adjusted in response to feedback from photo detectors 366 and 368. Detectors 366 and 368 may be omitted from particular embodiments.

In a particular embodiment, pump 356 may transmit laser light of a different wavelength than pump 358. For example, in a particular embodiment, module 354 may be provisioned within counterclockwise transport element 222, and forty traffic channels may be transmitted at a 100 Ghz spacing in the C-band (1530–1570 nm) in the counterclockwise direction. Pump 356 may transmit pump power at a wavelength within the about 1430–1470 nm range to amplify the traffic channels. Pump 358 may transmit pump power at a wavelength within the about 1330–1370 range to amplify the pump power from pump 356. In this embodiment, splitter modules 362 and 364 may comprise WDM filters. WDM filter 362 may filter pump power corresponding to the wavelength of pump 358, and filter 364 may filter pump power corresponding to the wavelength of pump 356.

In another embodiment, pumps 356 and 358 may transmit laser light in the same wavelength. In this embodiment, pump 354 may be operable during normal working conditions, and pump 358 may be turned off during normal working conditions and turned on in the event of a failure of pump 356 or a line cut. In this embodiment, splitter modules 362 and 364 may comprise circulators.

In the configuration shown in FIG. 4E, amplification module 318 comprises pump/reflection module 370. Pump/reflection module comprises pump 372, isolator 354, and reflector 374, which may comprise a fiber Bragg grating mirror. Reflector 374 may allow for recycling of pump power in a counter-rotational direction as that transmitted by pump 372. Pump/reflection module 370 may be used in place of pump module 336 of FIG. 4A in certain embodiments.

In the configuration shown in FIG. 4F, amplification module 318 comprises single-source bi-directional pump module 380. Single-source bi-directional pump module 380 comprises pump 382, isolator 354, and coupler 330. As above, isolator 354 prevents feedback of the pump power. Coupler 330 splits the pump power into two signals, allowing the pump power from a single pump or single pump set to be transmitted in both the clockwise and counterclockwise directions. Single-source bi-directional pump module 380 may be used in place of pump module 336 of FIG. 4A in certain embodiments.

In the configuration shown in FIG. 4G, amplification module 318 comprises polarized pump module 450. Polarized pump module 450 comprises pumps 452, 454, 456, and 458, polarization mode couplers 460, coupler 466, filter 468, and photo detectors 462 and 464. Pumps 452 and 454 may provide pump power at a first wavelength, $\lambda_1$, and pumps 456 and 458 map provide pump power at a second wavelength, $\lambda_2$. In a particular embodiment, $\lambda_1$ may be about 1430 nanometers and $\lambda_2$ may be about 1470 nanometers to cover the C band range of about 1530 to 1565 nanometers. Coupler 466 may comprise a splitter/coupler 330 or a WDM filter. Polarization mode couplers 460 may reduce polarization dependant gain (PDG). Photo detectors 462 and 464 allow for gain control by gain peak channel monitoring of $\lambda_1$ and $\lambda_2$, respectively. Filter 468 may comprise a WDM filter. The configuration of module 450 allows for redundancy in the event of a failure by one of pumps 452, 454, 456 and/or 458. By monitoring the gain via the photodetectors 462 and 464 and adjusting the output of the pumps, the total gain profile of pumps 452, 454, 456 and/or 458 individually may be substantially similar as the total gain profile of all the pumps.

FIG. 4H illustrates details of an optical splitter/coupler 330 in accordance with one embodiment of the present invention. The optical splitter/coupler 330 may in other embodiments be combined in whole or in part with a waveguide circuit and/or free space optics. In the illustrated embodiment, the optical splitter/coupler 330 is a fiber coupler with two inputs and two outputs (a 2:2 splitter). It will be understood that in accordance with other embodiments of the present invention the splitter/coupler 330 may include one or any number of any suitable inputs and outputs and that the splitter/coupler 330 may comprise a greater number of inputs than outputs or a greater number of outputs than inputs. As discussed herein, splitter/couplers 330 are utilized in various embodiments of the present invention as splitters and/or as couplers.

Referring to FIG. 4H, the optical splitter/coupler 330 comprises a cover frame 490, first entry segment 492, second entry segment 494, first exit segment 496, and second exit segment 498.

First entry segment 492 and first exit segment 496 comprise a first continuous optical fiber. Second entry segment 494 and second exit segment 498 comprise a second continuous optical fiber. Outside of the cover frame 490, segments 492, 494, 496, and 498 may comprise a jacket, a cladding, and a core fiber. Inside the cover frame 490, the jacket and cladding may be removed and the core fibers twisted, coupled, or fused together to allow the transfer of optical signals and/or energy of the signals between and among the first and second continuous optical fibers. In this way, the optical splitter/coupler 330 passively combines optical signals arriving from entry segments 492 and 494 and passively splits and forwards the combined signal via exit segments 496 and 498. A plurality of signals may be combined and the combined signal split by combining and thereafter splitting the combined signal or by simultaneously combining and splitting the signals by transferring energy between fibers.

The optical splitter/coupler 330 provides flexible channel-spacing with little or no restrictions concerning channel-spacing in the main streamline. The splitter/coupler 330 may split the signal into two copies with substantially equal power. "Substantially equal" in this context means ±25%. In a particular embodiment, the coupler has a directivity of over −55 dB. Wavelength dependence on the insertion loss is less than about 0.5 dB. The insertion loss for a 2:2 coupler may be less than about −3.5 dB, and that for a 3:3 coupler may be less than about −5 dB. In other embodiments, the splitter/coupler may split the signal into two copies with substantially unequal power.

Figure 5:
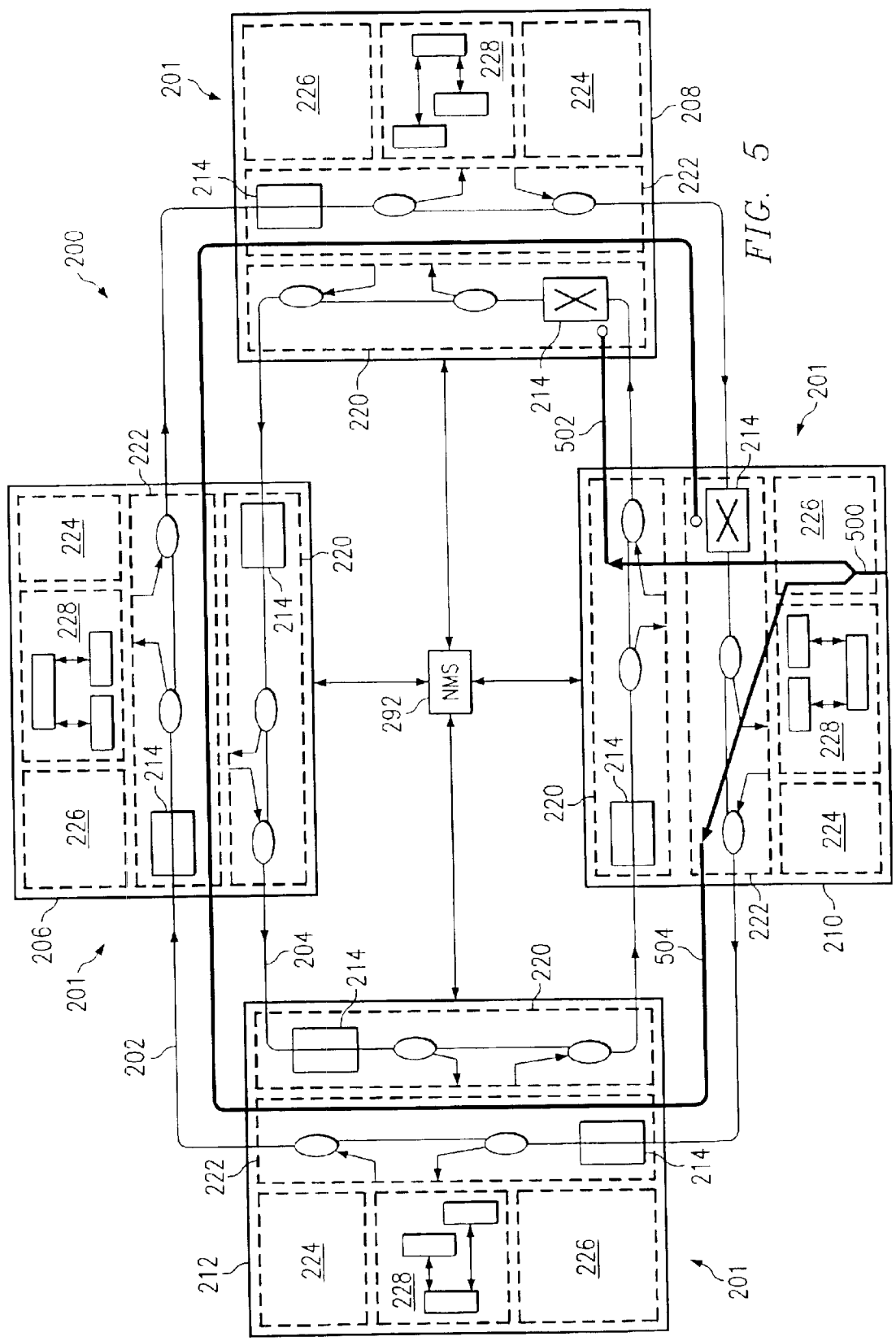
FIG. 5 is a block diagram illustrating the open ring configuration and light path flow of the optical network of FIG. 2 in accordance with one embodiment of the present invention.

FIG. 5 illustrates the optical network 200 with high level details of the nodes 206, 208, 210 and 212. As previously described, each node includes a counterclockwise transport element 220, a clockwise transport element 222, a distributing element 224, a combining element 226, and a managing element 228. The transport elements add and/or drop traffic to and from the rings 202 and 204. The combining element 226 combines ingress local traffic to generate an add signal that is provided to the transport elements 220 and 222 for transmission on the rings 202 and 204. The distributing element 224 receives a dropped signal and recovers local egress traffic for transmission to local clients. The managing element 228 monitors operation of the node 201 and/or network 200 and communicates with a NMS 292 for the network 200.

Referring to FIG. 5, each node 206, 208, 210 and 212 includes a ring switch 214 in each transport element 220 and 222 that is controllable to selectively open or close the connected ring 202 or 204 prior to the dropping or adding of traffic by the transport element 220 or 222 in the node. The ring switches 214 may be otherwise suitably positioned within one or more or each node 201 prior to the dropping and/or adding of traffic at an inside or outside edge of the node 201 or between the node and a neighboring node 201.

During normal operation, a single ring switch 214 is crossed or otherwise open in each ring 202 and 204 while the remaining ring switches 214 are closed. Thus, each ring 202 and 204 is continuous or otherwise closed except at the ring switch 214 that is open. The ring switches 214 that are open in the rings 202 and 204 together form a switch set that effectively opens the rings 202 and 204 of the network 200 in a same span and/or corresponding point of the network 200. A same span is opened in the network 200 in that, for example, the nodes 201 neighboring the span do not receive ingress traffic from the span. Such alignment of the open ring switches 214 in, along or at the periphery of a span allows each node 201 to communicate with each other node 201 in the network 200 while avoiding or minimizing interference from circulating traffic.

In the illustrated embodiment, ring switch 214 in the clockwise transport element 222 of node 210 is crossed, as is ring switch 214, in the counterclockwise transport element 220 of node 208. The remaining ring switches 214 are closed to a through position. A traffic channel 500 added at node 210 travels around the rings 202 and 204 in exemplary light paths 502 and 504. In particular, a counterclockwise light path 502 extends from the combining element 226 of node 210 to the counterclockwise transport element 220 where it is added to counterclockwise ring 204. On counterclockwise ring 204, light path 502 extends to node 208 where it is terminated by the crossed ring switch 214 of the counterclockwise transport element 220. Clockwise light path 504 extends from the combining element 226 of node 210 to the clockwise transport element 222 of node 210 where it is added to clockwise ring 202. On clockwise ring 202, light path 504 extends to ring 212, through the clockwise transport element 222 of ring 212, to ring 206, through the clockwise transport element 222 of ring 206, to node 208, through the clockwise transport element 222 of node 208, and back to node 210 where it is terminated by the crossed ring switch 214 on the ingress side of the clockwise transport element 222. Thus, each node 206, 208, 210 and 212 is reached by each other node from a single direction and traffic is prevented from circulating around either ring 202 and 204 or otherwise causing interference.

Figure 6:
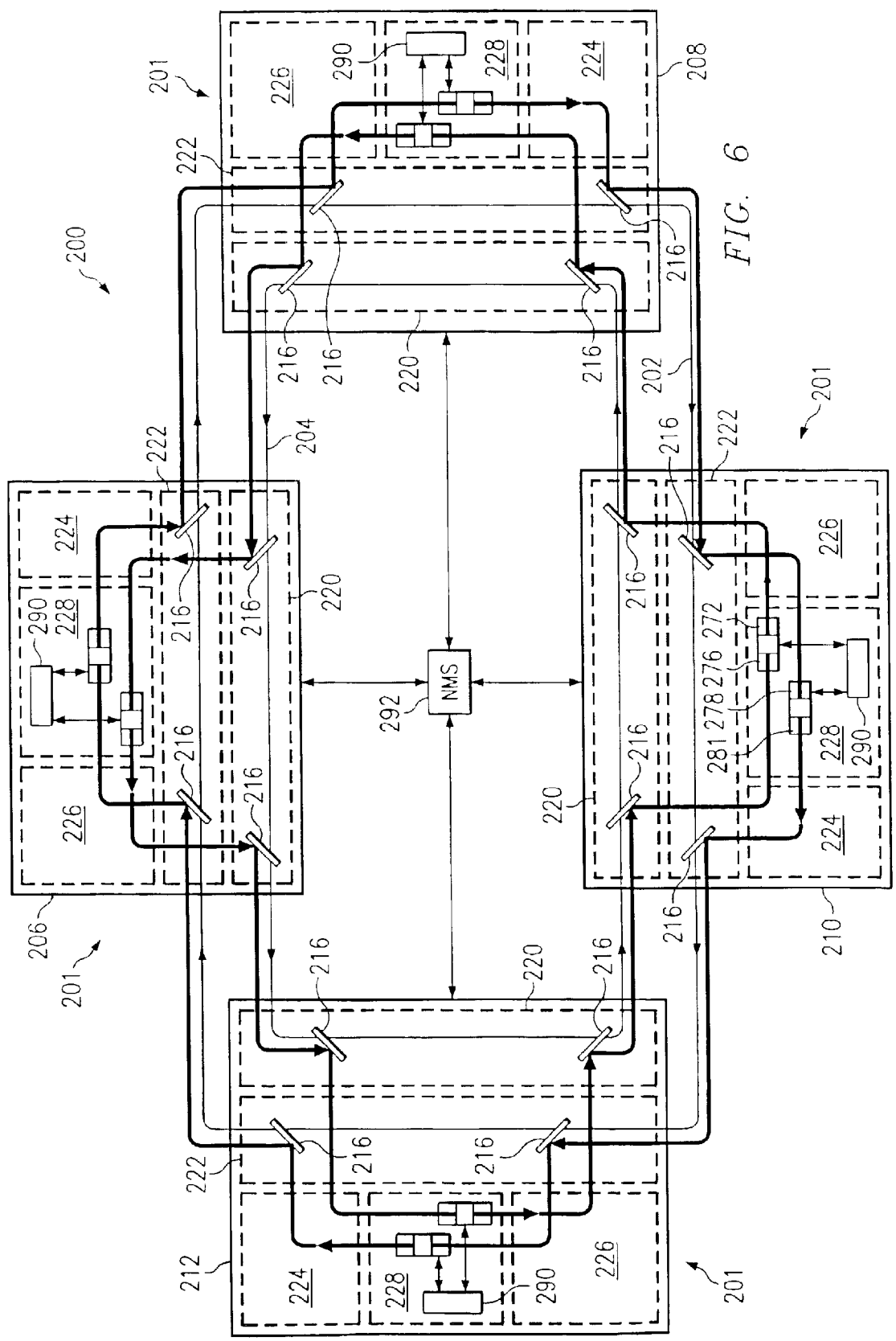
FIG. 6 is a block diagram illustrating the optical supervisory channel (OSC) flow in the optical network of FIG. 2 in accordance with one embodiment of the present invention.

FIG. 6 illustrates the optical network 200 with high level details of the nodes 206, 208, 210 and 212. The nodes each include the counterclockwise and clockwise transport elements 220 and 222 as well as the combining element 224, distributing element 226, and managing element 228. In addition to adding and dropping traffic channels to and from the rings 202 and 204, the transport elements 220 and 222 add and drop the OSC to and from the rings 202 and 204 for processing by managing element 228.

Referring to FIG. 6, as previously described, the transport elements 220 and 222 include an OSC filter 216 at an ingress point prior to the ring switches 214 to filter out and/or otherwise remove the OSC from the rings 202 and 204. In each node 201, the OSC signal from each ring 202 and 204 is passed to corresponding optical receiver 276 and 278 of the OSC unit for processing by EMS 290. In addition, the OSC signal generated by the EMS 290 for each ring 202 and 204 is transmitted by the optical sender 272 or 281 onto the corresponding ring 202 and 204 for transmission to the next node 201.

In normal operation, each node 201 receives an OSC signal from the neighboring nodes along the rings 202 and 204, processes the signal and passes the OSC signal on and/or adds its own OSC signal for transmission to the neighboring nodes.

Placement of the OSC filters 216 at the periphery of the transport elements 220 and 222 outside the ring switches 214 allows each node 201 to receive the OSC signal from its neighboring or adjacent nodes 201 regardless of the open/close status of its ring switches 214. If the OSC filters are inside the ring switches 214, for example in embodiments where the ring switches 214 are outside of the nodes 201, the OSC signals may be looped back between rings 202 and 204 at the edges of the open span. For example, for the illustrated embodiment, the EMS 290 of node 208 may pass received OSC information destined for node 210 from the clockwise OSC unit to the counterclockwise OSC unit for transmission to node 210 on the counterclockwise ring 204. Similarly, OSC information received at node 210 and destined for node 208 may be passed by the EMS 290 of node 210 from the counterclockwise OSC unit to the clockwise OSC unit for transmission to node 208 on the clockwise ring 202.

Figure 7:
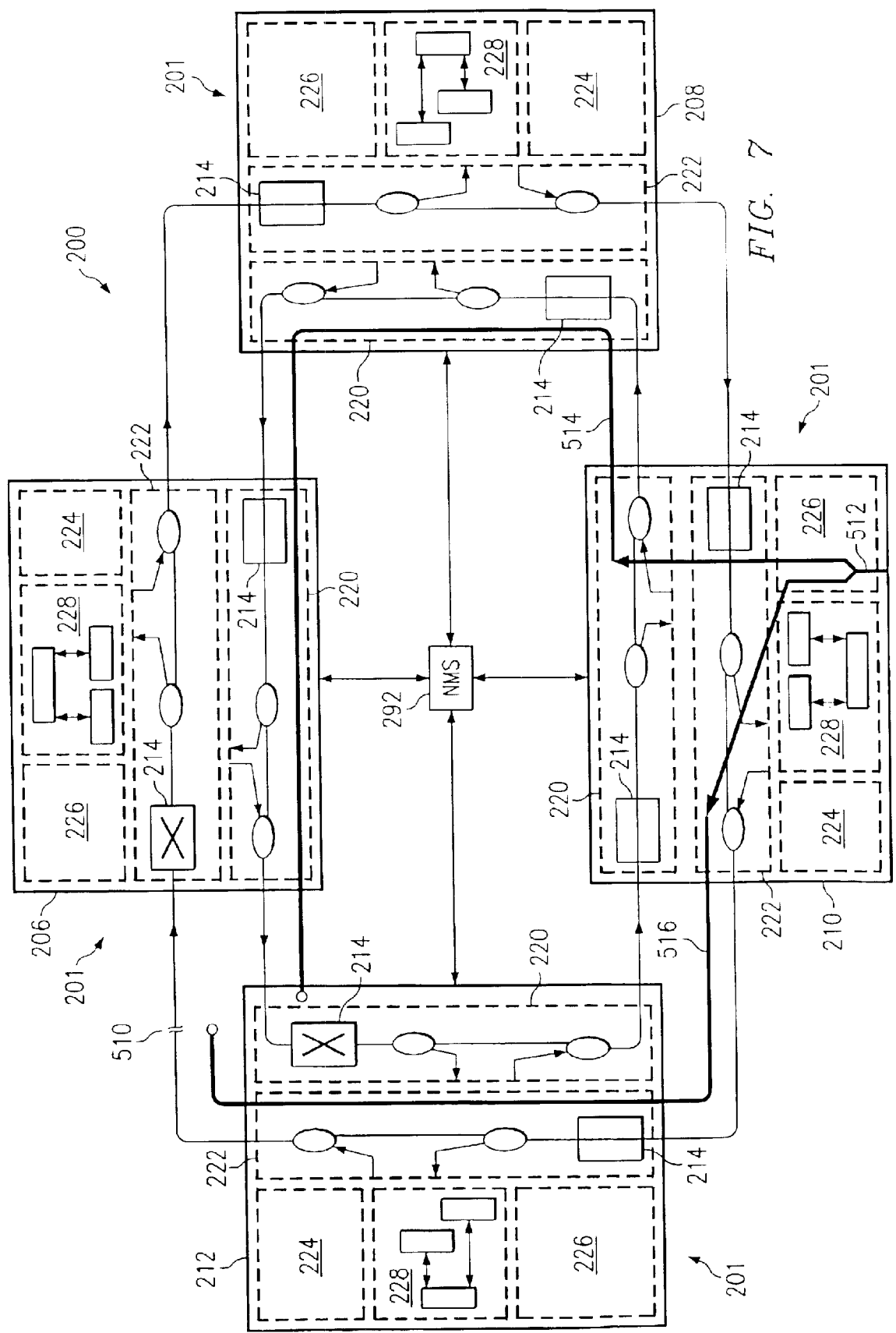
FIG. 7 is a block diagram illustrating protection switching and light path protection in the optical network of FIG. 2 in accordance with one embodiment of the present invention.

FIG. 7 illustrates protection switching and light path protection for network 200 in accordance with one embodiment of the present invention. As previously described, each node 206, 208, 210, and 212 includes clockwise and counterclockwise transport elements 220 and 222 as well as the combining, distributing and managing elements 224, 226, and 228. The managing elements each communicate with NMS 292.

Referring to FIG. 7, a fiber cut 510 is shown in ring 204 between nodes 206 and 212. In response, as described in more detail below, the NMS 292 opens the ring switch 214 in counterclockwise transport element 220 of node 212 and the ring switch 214 in clockwise transport element 222 of node 206, thus effectively opening the span between nodes 206 and 212. After opening the rings 202 and 204 on each side of the break, the NMS 292 closes any previously open ring switches 214 in the nodes 201.

After protection switching, each node 201 continues to receive traffic from each other node 201 in network 200 and an operable open ring configuration is maintained. For example, a signal 512 originated in node 210 is transmitted on counterclockwise light path 514 to nodes 208 and 206 and transmitted on clockwise light path 516 to node 212. In one embodiment, the NMS 292, EMS 290 and the 2×2 ring switches 214 may be configured for fast protection switching with a switching time of less than 10 milliseconds.

Figure 8:
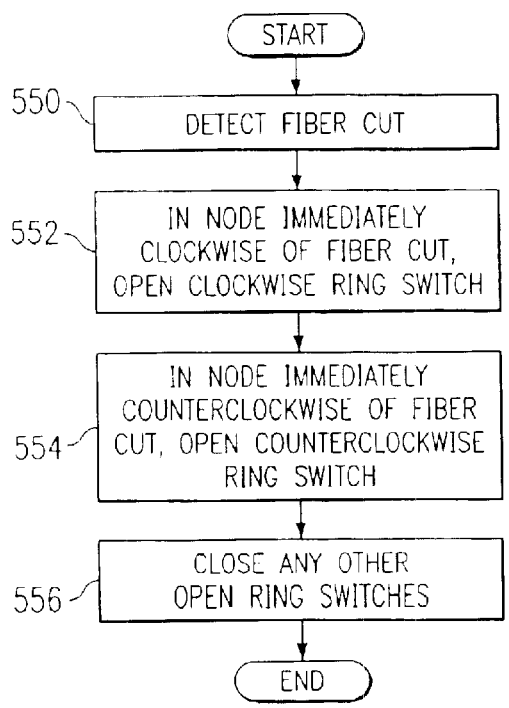
FIG. 8 is a flow diagram illustrating a method for protection switching of traffic in the optical network of FIG. 2 in accordance with one embodiment of the present invention.

FIG. 8 is a flow diagram illustrating a method for protection switching of an open ring optical network in accordance with one embodiment of the present invention. In this embodiment, the optical network may be network 200 including a plurality of nodes each having a ring switch at or proximate to an ingress point of each connected ring. The method may be used in connection with other suitable network and node configurations.

Referring to FIG. 8, the method begins at step 550 with the detection by the NMS 292 of a fiber cut of ring 202 or 204 of the network 200. The NMS 292 may detect and locate the fiber cut based on the OSC and/or other signals communicated by the node EMSs 290 to the NMS 292.

At step 552, the NMS 292 issues a command to the EMS 290 in the node 201 immediately clockwise of the cut to open the clockwise ring switch 246 in the clockwise transport element 222, thus opening the clockwise ring 202 at that node 201.

At step 554, the NMS 292 issues a command to the EMS 290 in the node 201 immediately counterclockwise of the cut to open the counterclockwise ring switch 244 in the counterclockwise transport element 220, thus opening the counterclockwise ring 204 at that node 201.

At step 556, any other ring switches 214 in the nodes 201 of the network 200 are closed. Thus, each ring 202 and 204 is essentially continuous with a single open point and/or segment. The open segment may be at a discrete switch and/or transmission element or may include part, all or even more than a span between nodes of the network 200. It will be understood that additional switches 214 in the rings 200 and/or 204 may remain open and transmission elements in the rings 202 and/or 204 may be turned off so long as, in one embodiment, each node 201 is able to communicate with each other node 201 through one of the rings 202 or 204.

An example of protection switching is illustrated by FIGS. 5 and 7. Referring back to FIG. 5, for example, the clockwise and counterclockwise rings 202 and 204 of network 200 are open in the transport elements 222 and 220 of nodes 210 and 208, respectively. In response to at least a ring cut 510 as illustrated by FIG. 7, protection switching crosses ring switch 214 and clockwise transport element 222 of node 206 and ring switch 214 of counterclockwise transport element 220 of node 212. Thus, in FIG. 7 the clockwise and counterclockwise rings 202 and 204 are opened at nodes 206 and 212, respectively. The previously crossed ring switches in nodes 208 and 210 are closed to a through position to allow each node 201 to continue to receive traffic from each other node 201 in the network 200. The fiber cut 510 may be repaired at a convenient time after protection switching is completed. Furthermore, it should be noted that, after repair of the fiber cut 510, there is no need to revert the switches 214 and nodes 201 to their pre-cut states. For example, the network initially configured as shown in FIG. 5 that is then configured as shown in FIG. 7 due to fiber cut 510, may remain configured as shown in FIG. 7 even after the cut 510 has been repaired. In this way, the steps shown in FIG. 8 may be repeated for any number of fiber cut events.

As previously described, the ring switches 214 and the nodes 201 may be reconfigured to provide protection switching in response to other types of network failures that would otherwise prevent one node 201 from communicating local and/or other traffic to a neighboring node 201. For example, in response to a failure of a unit within clockwise transport segment 222 of node 206, the failed unit may be turned off (if appropriate) and the adjacent ring switch 246 actuated from a closed, or through position to an open, or cross position. As previously described, a crossed ring switch 214 terminates traffic on the connected ring 202 or 204 but may pass the traffic to the OSAs for monitoring by the EMS 290 and/or for loop back and other types of testing. Next, the ring switch 214 of the counterclockwise transport element 220 in node 212 may also be repositioned to the crossed position.

After the ring switches are crossed, the previously crossed ring switches 214 are closed to a through position to allow each node 201 to fully communicate with each other node 201. During continued operation, the failed unit may be replaced and proper operation of the new unit confirmed with loopback and/or localized testing as described in more detail below. After the failed unit is replaced and proper operation is confirmed, the network 200 may be left in the current configuration, reverted to the previous configuration or configured to yet another configuration to support localized and/or loopback testing within the network 200.

A failure of an amplifier in the combining element 226 may be detected by an equipment alarm for a combining amplifier. For example, in response to an equipment alarm for a combining amplifier in the combining element 226 of the clockwise transport element 222 of node 210, the ring switch 246 of clockwise transport element 222 in node 212 may be crossed and the ring switch 244 in the counterclockwise transport element 220 of node 210 may also be crossed. Previously opened ring switches 214 are at the same time closed and the failed combining amplifier unit in node 210 replaced and tested to confirm proper operation.

In one embodiment, a test signal may be inserted into the network and transmitted on the clockwise and/or counterclockwise rings. The signal may be terminated at a crossed ring switch 214 and transmitted via port 248 or 252 of FIG. 7 to the OSA for analysis. By selectively closing the ring switches in the appropriate nodes, a selected light path may be tested with the OSA.

Likewise, in yet another embodiment, a localized area may be defined as necessary for light path or component testing, repair or replacement. To isolate the elements of the localized area from the rest of the in-service network, the clockwise ring switches 214 of a first node and the counterclockwise ring switch of a second node are opened. The localized area thus includes the opposite parts of two neighboring nodes such that, in one embodiment, a localized area may be defined covering any device of the nod-e in the network. Thus, testing, replacement, and/or repair of components within the localized area may be conducted without interfering with the in-service network.

In certain circumstances, it may be desirable to test a light path originating from a combining element through the add coupler of a first node, transmitted around a ring through a plurality of nodes, and returning through the drop coupler of the first node to the distributing element of the first node. In this way, all the elements of each transport segments of a given ring direction of each node may be tested. Such a light path may be created by physically separating the optical fiber at a point between the add coupler and the drop coupler of a transport segment of the first node.

Figure 9:
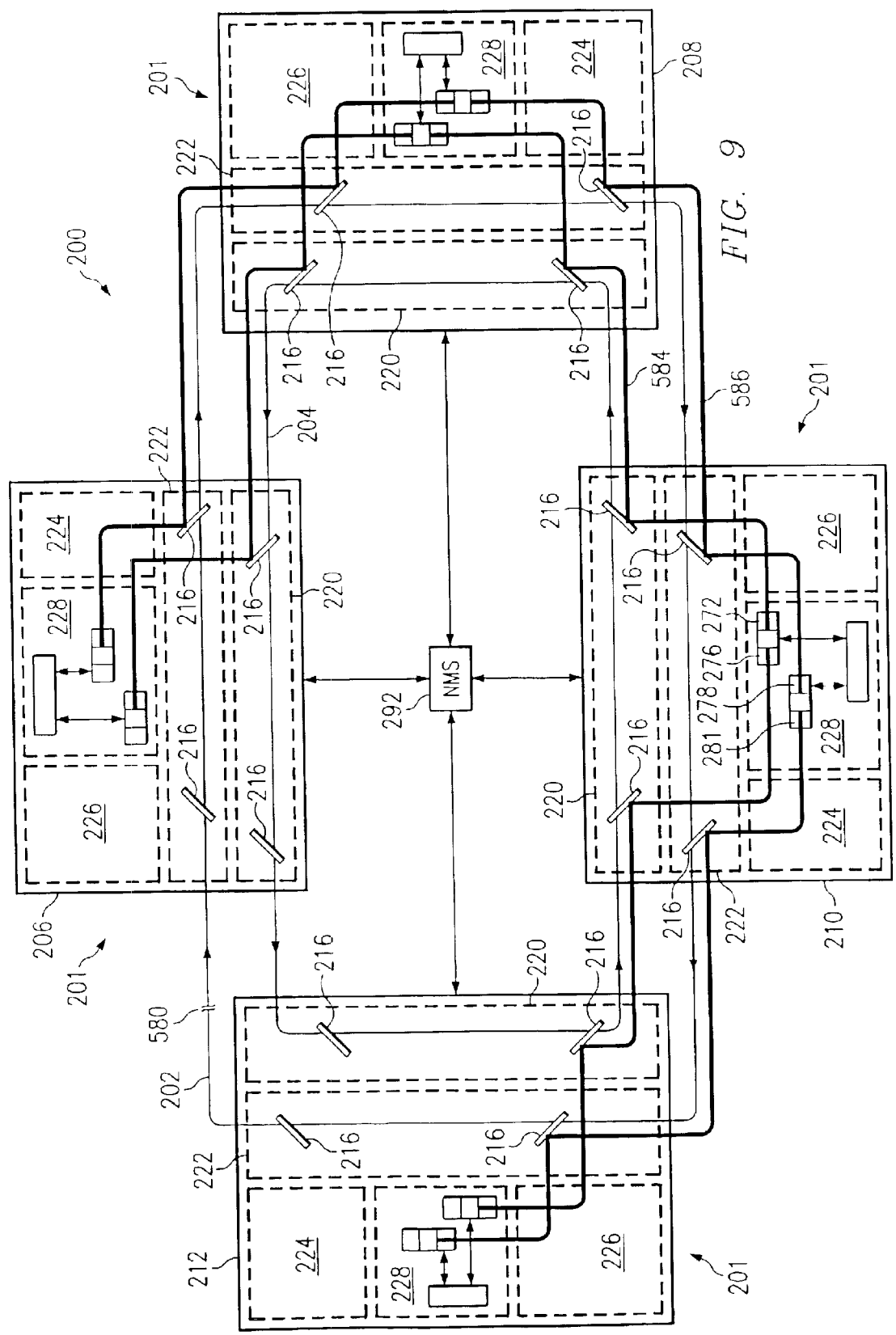
FIG. 9 is a block diagram illustrating OSC protection in the optical network of FIG. 2 in response to a line cut in accordance with one embodiment of the present invention.

FIG. 9 illustrates OSC protection for network 200 in response to a line cut in accordance with one embodiment of the present invention. In this embodiment, optical-electrical loopback in the managing elements 228 of the nodes 201 is used for protection of OSC.

Referring to FIG. 9, a fiber cut or other line break 580 is shown in clockwise ring 202 between nodes 206 and 212. In response to the fiber cut 580, an optical electrical loopback 582 is established from the counterclockwise OSC system to the clockwise OSC system through EMS 290 in node 206 and from the clockwise OSC system to the counterclockwise OSC system through EMS 290 in node 212.

In a specific embodiment, the optical-electrical loopback in node 206 comprises receiving at the counterclockwise OSC unit of the managing element 228 of node 206 the OSC 584 from the counterclockwise ring 204 and processing the OSC at the EMS 290 as described above in reference to FIG. 2. However, instead of transmitting the processed OSC as an egress signal on the counterclockwise ring 204 from node 206, the processed OSC is transmitted from the EMS 290 to the clockwise OSC unit and then onto clockwise ring 202, therefore looping the OSC back to node 206 from a counterclockwise to a clockwise signal.

Similarly, the optical-electrical loopback in node 212 comprises receiving at the clockwise OSC unit of the management element 228 of node 212 the OSC 586 from the clockwise ring 202 and processing the OSC at the EMS 290 as described above in reference to FIG. 2. However, instead of transmitting the processed OSC as an egress signal on the clockwise ring 202 from node 212, the processed OSC is transmitted from the EMS 290 to the counterclockwise OSC unit and then to counterclockwise ring 204, therefore looping the OSC back to node 212 from a clockwise to a counterclockwise signal. In this way, each node 201 in the network 200 continues to receive the OSC from each other node 201 in the network 200. The optical-electrical loopback 582 may be used during normal or protection-switched operations and may be used when the OSC signal is transmitted in-band or in another embodiment which the OSC signal passes through the ring switches 214.

The OSC flow procedure is the same for both the normal and the protection-switching scenarios. For example, in FIG. 5, if a ring switch 214 in the counterclockwise transport element 220 of the node 208 and a ring switch 214 in the clockwise element 222 have the cross positions shown in FIG. 4, it may be wise to deploy the optical-electrical loopbacks from clockwise to counterclockwise in the node 208 and from counterclockwise to clockwise in node 220.

Figure 10:
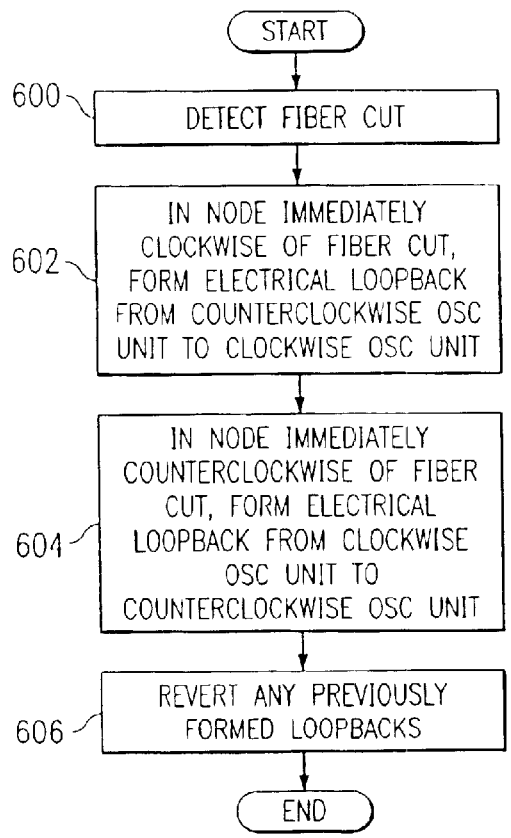
FIG. 10 is a flow diagram illustrating a method for OSC protection switching in the optical network of FIG. 2 in accordance with one embodiment of the present invention.

FIG. 10 illustrates a method for OSC protection switching in an optical network in accordance with one embodiment of the present invention. In this embodiment, protection switching is implemented in response to a fiber cut. However, it will be understood that OSC protection switching may be implemented in response to other types of failures and may be implemented in conjunction with light path protection switching.

Referring to FIG. 10, the method begins at step 600 with the detection by the NMS 292 of a fiber cut 580 in a span of a ring 202 or 204 of the optical network 200. The NMS 292 may detect the failure based on OSC and/or other signals from EMS 290 of the nodes 201.

At step 602, the NMS 292 issues a command to the EMS 290 in the node 201 immediately clockwise of the cut 580 to form an electrical loopback from the counterclockwise OSC unit to the clockwise OSC unit, thus creating, as described above, an optical-electrical loopback of the OSC from the counterclockwise ring 204 to the clockwise ring 202. Of course, the EMS 290 in the node 206 may detect the fiber cut 580 and execute this electrical loopback without the command from NMS 292.

At step 604, the NMS 292 issues a command to the EMS 290 in the node 201 immediately counterclockwise of the cut to form an electrical loopback from the clockwise OSC unit to the counterclockwise OSC unit, thus creating, as described above, an optical-electrical loopback of the OSC from the clockwise ring 202 to the counterclockwise ring 204. It will be understood that in this and other forms of protection switching, the NMS 292 may itself directly control devices in the nodes 201, may otherwise communicate with the devices to provide protection switching and/or the managing elements 228 of the nodes 201 may communicate among themselves to provide the functionality of the NMS 292.

At step 606, any other nodes 201 containing loopbacks that may have been previously formed are reverted to a non-loopbacked state. Or, if the OSC optical-electrical loopback procedure is deployed in nodes which have the ring switch in the cross-position, the reverting is not required. In this way, OSC data may continue to be transmitted by and received and processed at each node 201 in the network 200. After completion of the method, the fiber cut 580 may be repaired and tested. Also as above, after repair of the fiber cut 580, there is no need to revert the network 200 to its pre-switch state.

Figure 11:
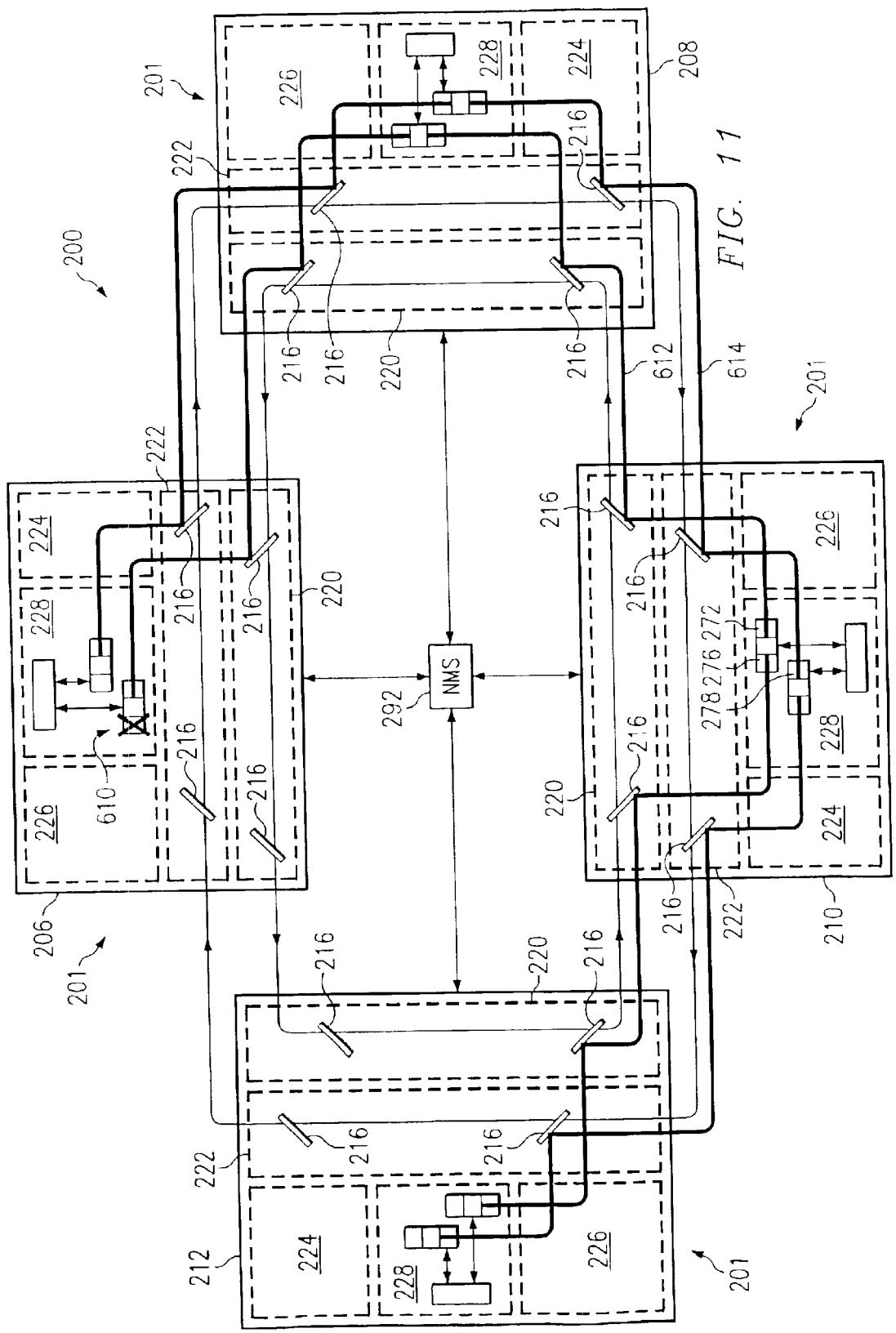
FIG. 11 is a block diagram illustrating OSC protection in the optical network of FIG. 2 in response to an OSC equipment failure in accordance with one embodiment of the present invention.

FIG. 11 illustrates OSC protection switching in the network 200 in response to an OSC equipment failure in accordance with one embodiment of the present invention. In this embodiment, protection switching is implemented for failure of an OSC sender. Failure of an OSC filter 216 or an OSC receiver 276 or 278 may necessitate similar protection switching so that each node 201 may continue to be serviced by OSC data even in the event of an equipment failure.

Referring to FIG. 11, counterclockwise OSC sender 281 of node 206 is detected as having failed. In a particular exemplary embodiment, a failure of an OSC optical sender 272 or 281 or an OSC optical receiver 276 or 278 may be detected by the NMS 292 or EMS 290 in the node 206 based on an LOL alarm for the optical receiver or a downstream optical receiver with or without another failure alarm. For example, an equipment alarm for the optical sender 281 in the counterclockwise OSC unit of the managing element 282 of node 206 would indicate a failure 610 of that optical sender. In response, the NMS 292 or EMS 290 in the node 206 may loopback counterclockwise OSC 612 to clockwise OSC at node 206. At node 212, the NMS 292 loopbacks the clockwise OSC 614 to the counterclockwise OSC. Any previous loopbacks in nodes 208 and/or 210 are broken and the information sent through the nodes.

After protection switching, the failed optical sender 281 may be replaced and thereafter tested using clockwise OSC. After confirming operation of the replaced optical sender 281, the network 200 may continue to operate in its present state or may revert to the initial OSC state. As previously discussed, for a fiber cut between nodes 206 and 210 the same procedure may be followed with the fiber cut repaired and tested.

Figure 12:
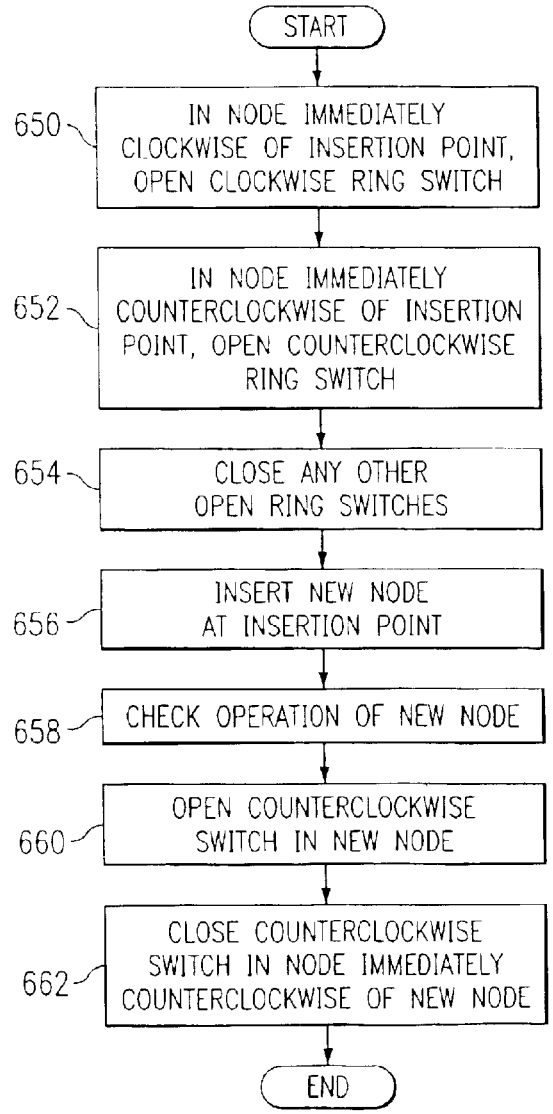
FIG. 12 is a flow diagram illustrating a method for inserting a node into the optical network of FIG. 2 in accordance with one embodiment of the present invention.

FIG. 12 illustrates a method for inserting a node 201 into the optical network 200 in accordance with one embodiment of the present invention. Node insertion may take full advantage of the scalability in the design of network 200. Other suitable elements may be similarly inserted between the existing nodes 201 of the optical network 200.

Referring to FIG. 12, the method begins with step 650 wherein the clockwise ring switch 214 is opened in the node 201 immediately clockwise of the insertion point for the new node. Proceeding to step 652, the counterclockwise ring switch 214 is opened in the node 201 immediately counterclockwise of the insertion point. At step 654, any other open ring switches 214 are closed. Thus, the nodes 201 of the network 200 may each communicate with each other without communicating across a span in which the new node is to be added.

Proceeding to step 656, the new node is inserted at the insertion point. Such insertion may require the physical separation of the clockwise and counterclockwise optical ring fibers. At step 658, the operation of amplifiers, switches, and other elements of the new node may be checked and tested.

Proceeding to step 660, the counterclockwise switch 214 in the new node is opened. At step 662, the counterclockwise switch 214 is closed in the node 201 immediately counterclockwise of the new node. In this way, the counterclockwise ring 204 is open at the new node and the clockwise ring 202 is open at the node 201 immediately clockwise of the new node. In another embodiment, the clockwise switch 214 in the new node may be opened and the clockwise switch 214 in the node immediately clockwise of the new node may be closed.

Figure 13:
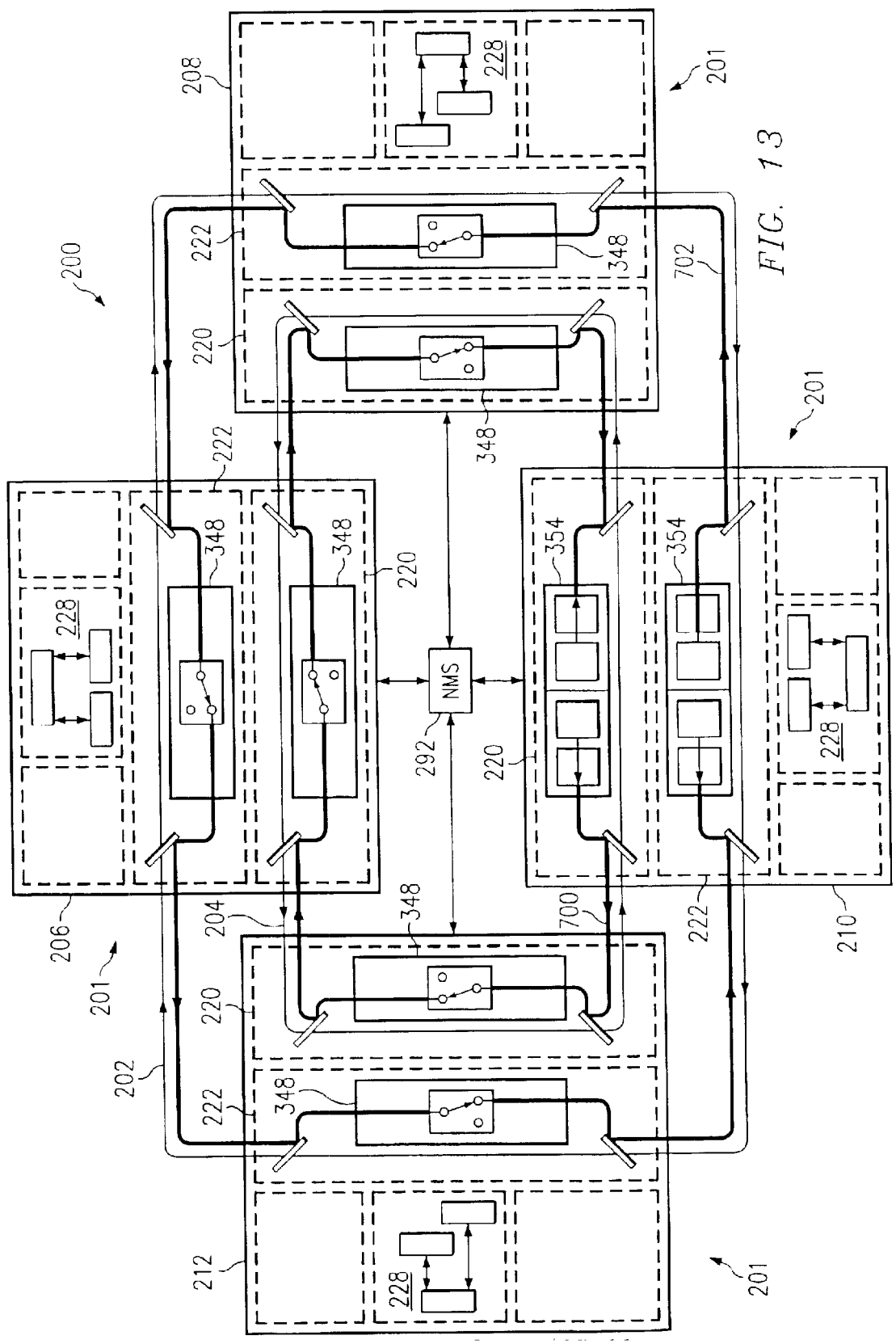
FIG. 13 is a block diagram illustrating the light path of the Raman amplification pump power in the optical network of FIG. 2 in accordance with one embodiment of the present invention.

FIG. 13 is a block diagram illustrating the light path of the Raman amplification laser light in the optical network of FIG. 2 in accordance with one embodiment of the present invention. Referring to FIG. 13, the clockwise and counterclockwise transport elements of node 210 comprise pump module 354 as described above in reference to FIG. 4D. Each amplification module 354 is operable to transmit pump power of a first wavelength in the clockwise direction and pump power of a second wavelength in the counterclockwise direction. During normal operations, as illustrated in FIG. 13, pump power—shown as the bold lines 700 and 702—is transmitted only in a counter-rotational direction relative to the traffic-carrying signal.

The transport elements of the remaining nodes 206, 208, and 212 comprise by-pass amplification modules 348, as described above in reference to FIG. 4C. As described above, amplification modules 348 are selectively operable to either bypass pump power around the add/drop and switch elements of the nodes 201 or to terminate pump power at the node 201. Switch settings may be independently set within the network and within each node. Normal operations are illustrated in FIG. 13, with the modules 348 configured to bypass the add/drop and switch elements of nodes 206, 208, and 212 and thus amplify substantially the entire circumference of rings 202 and 204.

FIG. 14 is a flow diagram illustrating a method of Raman amplifying an optical network in accordance with one embodiment of the present invention. In this embodiment, a single pump source or set of pump sources at a single node may be used to amplify substantially the entire optical network.

Referring to FIG. 14, the method begins with step 710 wherein traffic is transmitted around the optical fiber ring. At step 712, traffic may be added and/or dropped at a plurality of nodes of the ring. In a particular embodiment, the traffic may be passively added and/or dropped and channel spacing flexibility may be maintained.

Proceeding to step 714, pump power is generated at a pump source in an amplification module within a node of an optical network. The pump source generates and/or provides at least one wavelength of pump light. At step 716, the signal is distributed from the pump source through the optical ring or rings, thus Raman amplifying the traffic.

At step 718, pump power is bypassed around the add/drop elements of the nodes of the network. In this way, the traffic-conveying signal of the ring network is efficiently amplified by a single, scalable source or a limited set of sources.

Figure 15:
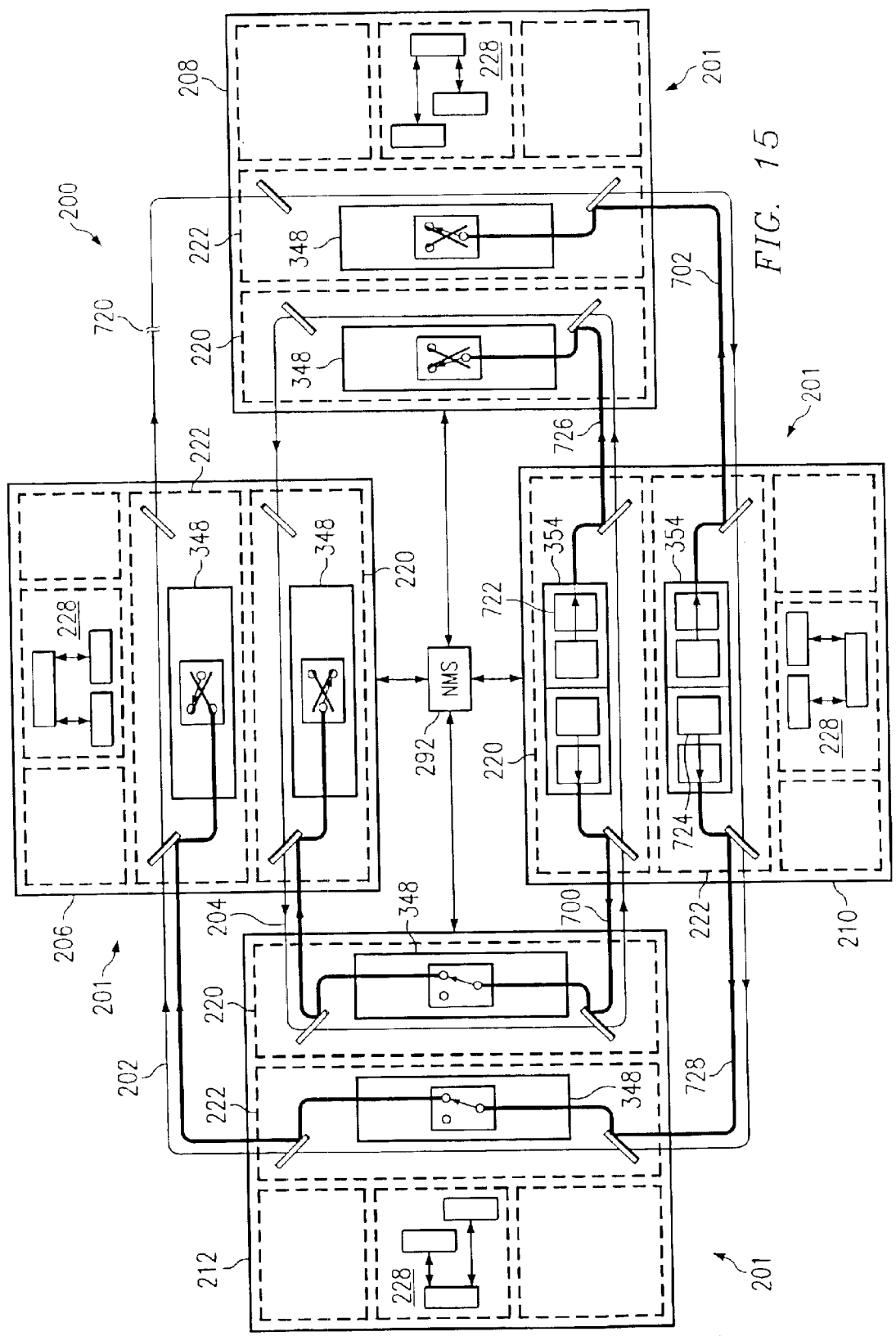
FIG. 15 is a block diagram illustrating protection switching of the light path of FIG. 13 in accordance with one embodiment of the present invention.

FIG. 15 is a block diagram illustrating protection switching of the light path of FIG. 12 in accordance with one embodiment of the present invention. Referring to FIG. 15, line cut 720 interrupts the amplified signal. Amplification modules 348 of nodes 206 and 208 adjacent to the cut 702 are switched to terminate the pump power at those nodes.

Line cut 720 and/or the protection switching isolates a portion of the rings 202 and 204 from the counter-rotational pump power 700 and 702. Therefore, further in response to the line cut, pumps 722 and 724 in amplification modules 354 of node 210 begin transmitting pump power 726 and 728, thus providing continuing amplification to rings 202 and 204, albeit in the same direction as the traffic-carrying signal.

FIG. 16 is a flow diagram illustrating a method of protection switching the Raman amplification light path in accordance with various other embodiments of the present invention. Traffic of a Raman amplified network of the present invention may be, as described above, amplified with counter-propagating pump power. An interruption of the network, such as a line cut, may necessitate protection switching to safely maintain amplification of the network.

Referring to FIG. 16, the method begins with step 750 wherein an equipment failure or fiber-cut is detected at a particular node of the network. For example, the fiber-cut may be detected through the loss of OSC signal. At step 752, the nodes adjacent to the failure or line cut are determined. At step 754, the supply of pump power is terminated in the by-pass elements of the adjacent nodes. In the pump source embodiment described in reference to FIG. 15, the termination may occur by activating the switches of modules 348 in the nodes adjacent to the interruption. Other suitable means for terminating the pump power to the node, such as optical attenuators, may be employed.

Finally, at step 756, pump power may be transmitted in both co-propagating and counter-propagating directions so as to maintain amplification of the traffic-carrying signal despite the termination of pump power at the nodes adjacent to the interruption. After the interruption is repaired, the network may be reverted to its pre-interruption state.

Figure 17:
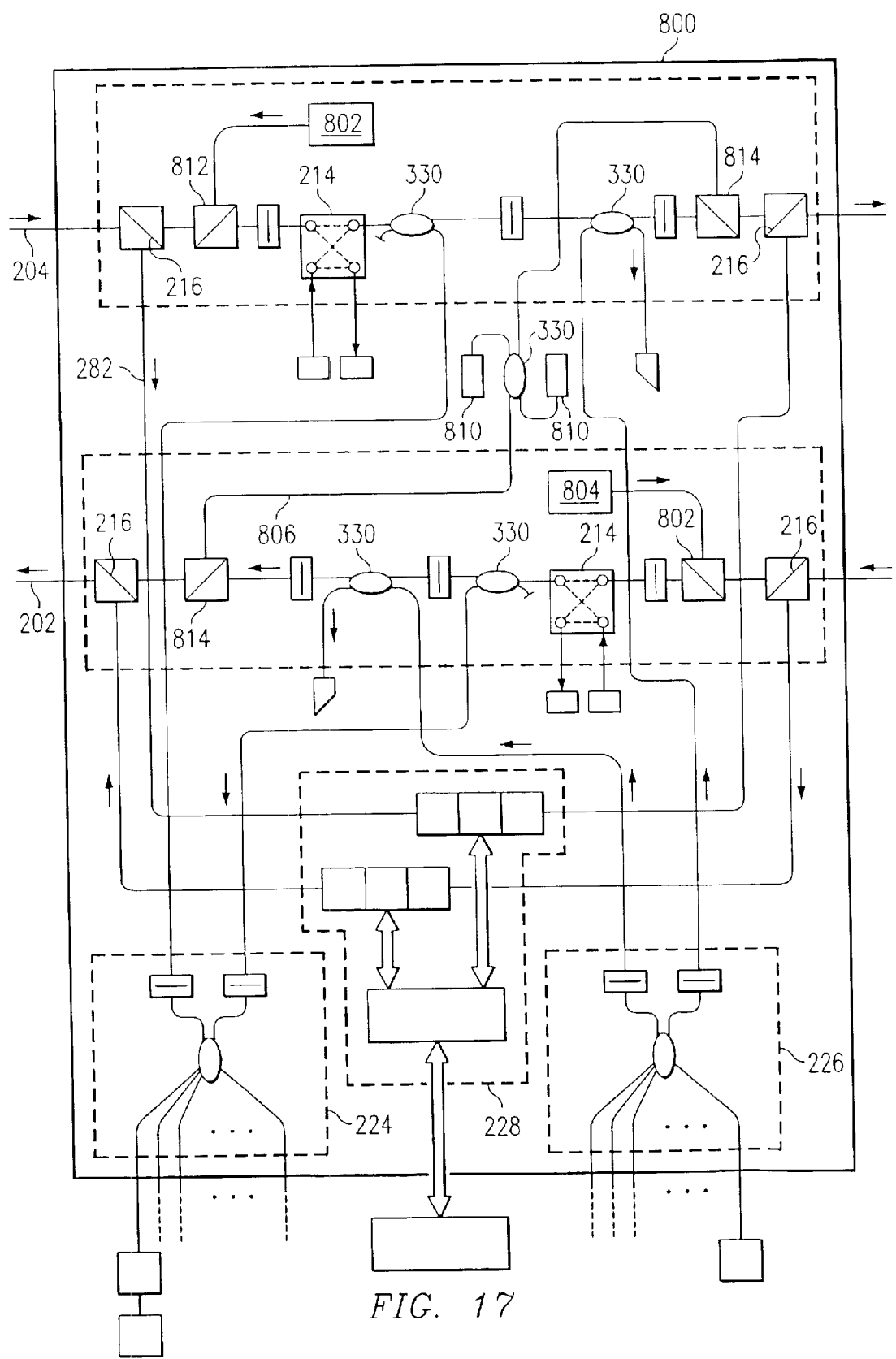
FIG. 17 is a block diagram illustrating details of a node of FIG. 2 in accordance with another embodiment of the present invention.

FIG. 17 is a block diagram illustrating details of an add/drop node 800 in accordance with another embodiment of the present invention. The node 800 is operable recycles pump power between the rings of a multi-ring network and may be used instead of or in addition to the nodes 201 of FIG. 3.

Referring to FIG. 17, the node 800 comprises distributing element 224, combining element 226, and managing element 228, splitters/couplers 330, ring switches 214, and OSC filters 216 as described above in reference to FIG. 3.

Pump modules 802 may comprise pumps, isolators, WDM filters, and/or other suitable devices to provide pump power to rings 202 and 204 via pump filters 812. Each of pump filters 814 separates counter-propagating pump power from the respective fiber ring to which the filter 814 is coupled and forwards that excess power to the other ring via cross-ring connection fiber 806. In this way, excess pump power from one ring may be recycled so as to Raman amplify the other ring. Tap monitors 810 may monitor pump power forwarded through connection fiber 806.

FIG. 18 is a block diagram illustrating a plurality of optical networks in a metro access/metro core environment in accordance with one embodiment of the present invention. Metro access optical networks 854 may be amplified by one or more pump laser diode units 856 in hub 850, which in turn is coupled to metro core network 852. Cascaded splitter/couplers 330 forward pump power from the diodes to the ring networks. Variable optical attenuators (VOAs) 858 may control power levels to each of the networks 854. In a particular embodiment, four metro access ring networks 854 may be amplified by a single 2 watt laser 856. In another embodiment, a plurality of pump sources 856 may each comprise a laser transmitting pump power at a different wavelength.

Although the present invention has been described with several embodiments, various changes and modifications may be suggested to one skilled in the art. It is intended that the present invention encompass such changes and modifications as fall within the scope of the appended claims.

What is claimed is:

1. An optical network, comprising:
   an optical ring operable to transport a traffic signal between a plurality of nodes;
   a Raman pump source coupled to the optical ring, the pump source operable to provide pump power to at least a portion of the optical ring; and
   the nodes connected by the optical ring, each node comprising an optical splitter operable to at least passively drop traffic from the optical ring and further comprising a pump filter operable to separate at the node the Raman pump power from the traffic signal.

2. The optical network of claim 1, wherein each node further comprises an optical splitter operable to at least passively add traffic to the optical fiber ring.

3. The optical network of claim 1, wherein the pump source forwards pump power in a counter-propagating direction relative to the traffic-carrying signal.

4. The optical network of claim 3, wherein the pump source comprises a first pump source and further comprising a second pump source forwarding pump power in a co-propagating direction relative to the pump power of the traffic-carrying signal for Raman amplification of the first pump source.

5. The optical network of claim 3, wherein the pump source comprises a first pump source and further comprising a second pump source forwarding pump power in a co-propagating direction relative to the pump power of the traffic-carrying signal for Raman amplification of the traffic-carrying signal.

6. The optical network of claim 5, wherein the second pump source is selectively operable to forward pump power in the event of a failure of the first pump source.

7. The optical network of claim 5, wherein the first pump source and the second pump source have a wavelength of about 100 nanometers lower than the wavelength of the traffic-carrying signal.

8. The optical network of claim 4, wherein the first pump source has a wavelength of about 100 nanometers lower than the wavelength of the traffic-carrying signal and the second pump source has a wavelength of about 100 nanometers lower than the wavelength of the first pump source.

9. The optical network of claim 1, wherein the optical fiber ring has a circumference of about 40 kilometers and substantially the entire ring is amplified by a single approximately 0.5 watt Raman laser.

10. A node for an optical network, comprising:
    a pump filter to separate Raman pump power from a traffic signal carried on the optical network,
    a bypass element to bypass the separated Raman pump power around an add/drop element of the node; and
    a combiner to re-combine the Raman pump power with the traffic signal after bypass of the add/drop element of the node.

11. The node of claim 10, wherein the bypass element further comprises a switch to selectively terminate the pump power.

12. The node of claim 10, wherein the add/drop element is a passive add/drop element.

13. A method of amplifying an optical network, comprising:
providing Raman pump power to at least a portion of an optical ring;
Raman amplifying a traffic signal transported on the optical ring using the Raman pump power;
at each of a plurality of nodes connected by the optical ring, passively at least dropping traffic from the optical fiber ring; and
separating at the nodes the Raman pump power from the traffic signal.

14. The method of claim 13, further comprising at each of the plurality of nodes, passively at least adding traffic to the optical fiber ring via an optical splitter.

15. The method of claim 13, wherein the providing pump power is in a counter-propagating direction relative to the traffic signal.

16. The method of claim 15, further comprising providing pump power in a co-propagating direction relative to the traffic signal.

17. The method of claim 15, further comprising selectively providing pump power in a co-propagating direction relative to the traffic signal in the event of a failure of the first pump source.

18. The method of claim 13, wherein the optical fiber ring has a circumference of about 40 kilometers and substantially the entire ring is amplified by a single approximately 0.5 watt Raman laser.

19. The optical network of claim 13, wherein the pump power has a wavelength of about 100 nanometers lower than the wavelength of the traffic signal.

20. A method of amplifying an optical network, comprising:
providing pump power to at least a portion of an optical fiber ring for Raman amplification of a traffic signal transported on the optical fiber ring; and
at each of a plurality of nodes connected by the optical fiber ring:
separating the pump power from the traffic signal;
bypassing the separated pump power around an add/drop element of the node; and
re-combining the pump power with the traffic signal after bypassing the add/drop element.

21. The method of claim 20, further comprising selectively terminating at a node the separated pump power.

22. The method of claim 20, wherein the optical fiber ring has a circumference of about 40 kilometers and substantially the entire ring is amplified by a single approximately 0.5 watt Raman laser.

23. The optical network of claim 20, wherein the pump power has a wavelength of about 100 nanometers lower than the wavelength of the traffic signal.

24. An optical network, comprising:
means for providing pump power to at least a portion of an optical fiber ring for Raman amplification of a traffic signal transported on the optical fiber ring;
means for, at each of a plurality of nodes connected by the optical fiber ring, passively at least dropping traffic from the optical fiber ring; and
means for separating at the nodes the pump power from the traffic signal.

25. The optical network of claim 24, further comprising at each of the plurality of nodes, means for passively at least adding traffic to the optical fiber ring via an optical splitter.

26. The optical network of claim 24, wherein the providing pump power is in a counter-propagating direction relative to the traffic signal.

27. The optical network of claim 26, further comprising means for providing pump power in a co-propagating direction relative to the traffic signal.

28. The optical network of claim 26, further comprising means for selectively providing pump power in a co-propagating direction relative to the traffic signal in the event of a failure of the first pump source.

29. The optical network of claim 24, wherein the optical fiber ring has a circumference of about 40 kilometers and substantially the entire ring is amplified by a single approximately 0.5 watt Raman laser.

30. The optical network of claim 24, wherein the pump power has a wavelength of about 100 nanometers lower than the wavelength of the traffic signal.

31. An optical network, comprising:
means for providing pump power to at least a portion of an optical fiber ring for Raman amplification of a traffic signal transported on the optical fiber ring; and
at each of a plurality of nodes connected by the optical fiber ring:
means for separating the pump power from the traffic signal;
means for bypassing the separated pump power around an add/drop element of the node; and
means for re-combining the pump power with the traffic signal after bypassing the add/drop element.

32. The optical network of claim 31, further comprising means for selectively terminating at a node the separated pump power.

33. The optical network of claim 31, wherein the optical fiber ring has a circumference of about 40 kilometers and substantially the entire ring is amplified by a single approximately 0.5 watt Raman laser.

34. The optical network of claim 31, wherein the pump power has a wavelength of about 100 nanometers lower than the wavelength of the traffic signal.

* * * * *

UNITED STATES PATENT AND TRADEMARK OFFICE
CERTIFICATE OF CORRECTION

PATENT NO. : 6,879,434 B2  
APPLICATION NO. : 10/193538  
DATED : April 12, 2005  
INVENTOR(S) : Aoki et al.

Page 1 of 1

It is certified that error appears in the above-identified patent and that said Letters Patent is hereby corrected as shown below:

On Title Page, Item (75),  
Inventors, Line 4, after "Yasuhiko Aoki," delete "Richardson County" and insert -- Richardson --.  
Column 1, line 65 and 66, after "100" delete "nanometérs" and insert -- nanometers --.  
Column 17, Line 49, delete "nod-e" and insert -- node --.

Signed and Sealed this

Nineteenth Day of December, 2006

JON W. DUDAS  
*Director of the United States Patent and Trademark Office*